Nov. 17, 1959

A. J. HENQUET ET AL 2,913,534

SWITCHING SYSTEM APPLICABLE PARTICULARLY TO AUTOMATIC TELEPHONE SYSTEM

Filed Feb. 1, 1955

17 Sheets-Sheet 1

Inventors
A. J. HENQUET
J. J. PERROT
By Robert Harding Jr.
Attorney

Inventors
A. J. HENQUET
J. J. PERROT
By Robert Harding Jr.
Attorney

Nov. 17, 1959 A. J. HENQUET ET AL 2,913,534

SWITCHING SYSTEM APPLICABLE PARTICULARLY
TO AUTOMATIC TELEPHONE SYSTEM

Filed Feb. 1, 1955 17 Sheets-Sheet 3

Inventors
A. J. HENQUET
J. J. PERROT
By Robert Harding Jr.
Attorney

Inventors
A. J. HENQUET
J. J. PERROT
By Robert Harding Jr.
Attorney

Inventors
A. J. HENQUET-
J. J. PERROT
By Robert Harding Jr.
Attorney

Nov. 17, 1959 A. J. HENQUET ET AL 2,913,534

SWITCHING SYSTEM APPLICABLE PARTICULARLY TO AUTOMATIC TELEPHONE SYSTEM

Filed Feb. 1, 1955 17 Sheets-Sheet 6

Inventors
A. J. HENQUET
J. J. PERROT
By Robert Harding Jr.
Attorney

Nov. 17, 1959 A. J. HENQUET ET AL 2,913,534

SWITCHING SYSTEM APPLICABLE PARTICULARLY TO AUTOMATIC TELEPHONE SYSTEM

Filed Feb. 1, 1955 17 Sheets-Sheet 7

Inventors
A. J. HENQUET
J. J. PERROT
By Robert Harding Jr.
Attorney

Nov. 17, 1959

A. J. HENQUET ET AL

SWITCHING SYSTEM APPLICABLE PARTICULARLY TO AUTOMATIC TELEPHONE SYSTEM 2,913,534

Filed Feb. 1, 1955

17 Sheets-Sheet 8

Inventors
A. J. HENQUET
J. J. PERROT
By Robert Harding Jr.
Attorney

Inventors
A. J. HENQUET
J. J. PERROT
By Robert Harding Jr.
Attorney

Inventors
A. J. HENQUET-
J. J. PERROT
By Robert Harding Jr.
Attorney

Nov. 17, 1959 A. J. HENQUET ET AL 2,913,534

SWITCHING SYSTEM APPLICABLE PARTICULARLY TO AUTOMATIC TELEPHONE SYSTEM

Filed Feb. 1, 1955 17 Sheets-Sheet 11

Inventors
A. J. HENQUET-
J. J. PERROT
By Robert Harding Jr.
Attorney

Inventors
A. J. HENQUET
J. J. PERROT
By Robert Harding Jr.
Attorney

Inventors
A. J. HENQUET
J. J. PERROT
By Robert Harding Jr.
Attorney

Inventors
A. J. HENQUET
J. J. PERROT
By Robert Harding Jr.
Attorney

Nov. 17, 1959 A. J. HENQUET ET AL 2,913,534

SWITCHING SYSTEM APPLICABLE PARTICULARLY TO AUTOMATIC TELEPHONE SYSTEM

Filed Feb. 1, 1955 17 Sheets-Sheet 15

Inventors
A. J. HENQUET
J. J. PERROT
By Robert Harding Jr.
Attorney

Nov. 17, 1959 A. J. HENQUET ET AL 2,913,534

SWITCHING SYSTEM APPLICABLE PARTICULARLY TO AUTOMATIC TELEPHONE SYSTEM

Filed Feb. 1, 1955 17 Sheets-Sheet 16

Inventors
A. J. HENQUET-
J. J. PERROT
By Robert Harding Jr.
Attorney

Nov. 17, 1959 A. J. HENQUET ET AL 2,913,534

SWITCHING SYSTEM APPLICABLE PARTICULARLY TO AUTOMATIC TELEPHONE SYSTEM

Filed Feb. 1, 1955 17 Sheets-Sheet 17

Inventors
A. J. HENQUET
J. J. PERROT
By Robert Harding Jr.
Attorney

United States Patent Office 2,913,534

Patented Nov. 17, 1959

2,913,534

SWITCHING SYSTEM APPLICABLE PARTICULARLY TO AUTOMATIC TELEPHONE SYSTEM

André Jean Henquet and Jean Jacques Perrot, Boulogne-Billancourt, France, assignors to International Standard Electric Corporation, New York, N.Y., a corporation of Delaware Application February 1, 1955, Serial No. 485,555

Claims priority, application France February 2, 1954

8 Claims. (Cl. 179—22)

Figure 1:
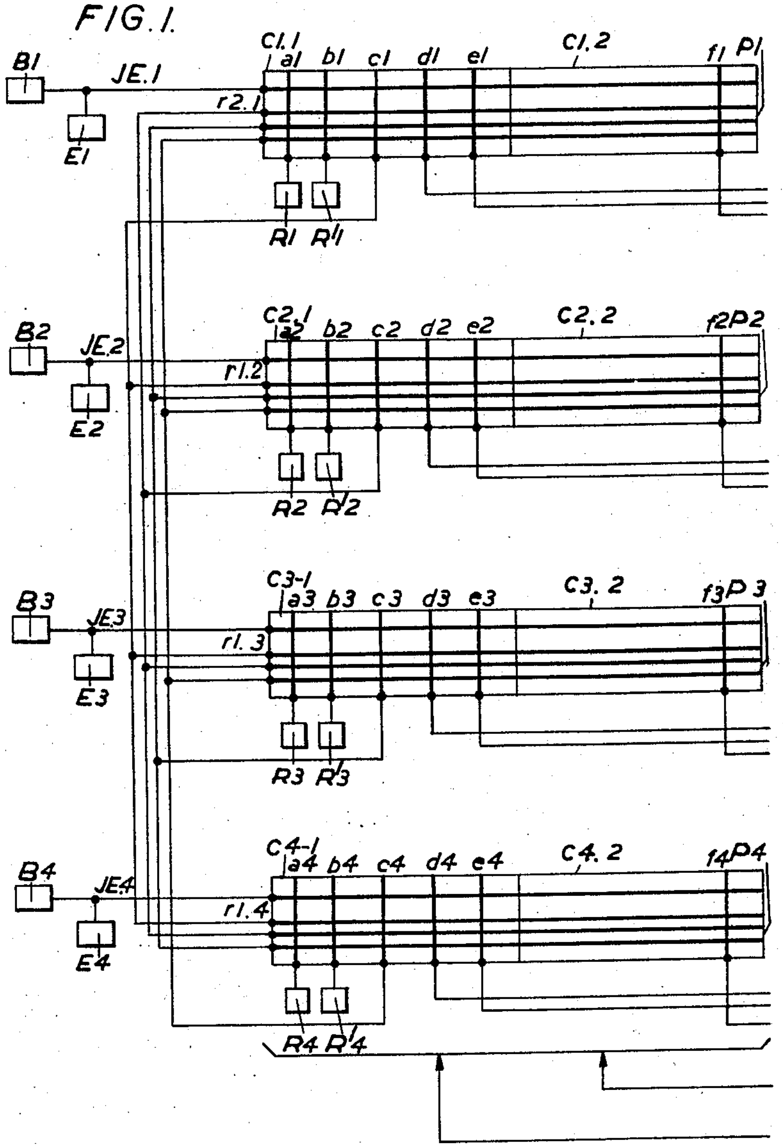

The present invention relates to automatic switching systems applicable in particular to automatic telephony and it relates more particularly to a group selection circuit applicable to automatic telephone systems utilizing "cross-bar" switches.

Automatic telephone systems are known utilizing such cross bar switches which comprise, besides a common switching element for the hunting of the calling lines and the final selection, one or several elements for group selection which permit the connection of the element for line selection to which the calling line is connected to the element for final selection which is connected to the called line. Such elements for group selection can also be used for trunk traffic when it is necessary to effect one or several selections between the calling exchange and the called exchange. In a general way, such elements for group selection may be used for connecting an incoming junction to an outgoing junction in function of the indications on the outgoing junction which are received through the incoming junction. In some automatic switching systems utilizing such elements for group selection, there is only provided one control element of the switches, generally termed marker, for each element for group selection. The fact that only one marker is used presents drawbacks, more particularly in that the element for group selection is blocked in case of a stop in the operation of the marker, thus rendering such elements for group selection of difficult use for the routing of trunk traffic.

One of the objects of the present invention is to provide an element for group selection which does not offer the drawbacks mentioned above.

Another object of the invention is to provide an element for group selection comprising two marker circuits capable of operating simultaneously for the choice of connections within the element for group selection.

According to one of the features of the invention, an element for group selection comprises in combination a stage of primary selection including a plurality of selectors grouped in primary groups and a stage of secondary selection including a plurality of selectors grouped in secondary groups, the levels of the selectors of a same group being multipled and the incoming junctions being connected to levels of the primary groups, outgoing junctions being connected to levels of the secondary groups, internal junctions being provided to connect each primary group to each of the secondary groups, and mutual assisting junctions being provided to connect each primary group to the other primary groups, two common control circuits, each common circuit being adapted to receive from the incoming calling junction, information on the outgoing required junction, and to mark or to cause the marking of the free internal junctions leading to secondary groups to which at least a free junction in the required direction is connected, to test the whole of the internal junctions simultaneously for each primary group so as to determine the primary group through which the call will be served by choosing preferably the group to which the calling incoming junction is connected, then to mark among the internal junctions thus determined an internal junction between the primary group thus determined and each of the secondary groups so as to choose a secondary group through which the call will be served, to choose eventually a free mutual assisting junction between the chosen primary group and the primary group to which is connected the calling incoming junction and to control the establishment of the connection, the two said marking circuits of the internal junctions to which the two marking circuits have respectively access being independent from each other, means being provided in each marker to check before the establishment of the connection that the other marker circuit does not control or is not ready to control a connection in the same group or groups of selectors having in common electromechanical means of control.

According to another feature of the invention, in such elements for group selection in which each internal junction comprises several conductors, different conductors are used for marking circuits to which the two marking circuits respectively have access.

According to another feature of the invention, in such an element for group selection comprising several internal junctions between each primary group and each of the secondary group, the first test for the choice of a primary group is effected inside each primary group simultaneously for a group of internal junctions comprising an internal junction towards each of the secondary groups so as to effect simultaneously the choice of a primary group and of a single internal junction towards each of the secondary group to which at least one outgoing junction in the required direction is connected.

According to another feature of the invention, the marking circuits of the mutual assisting junctions are common to the two marking circuits and means are provided in each of the marker circuits to check whether the other marker does not test the said mutual assisting junctions, said means being provided to cause immediately the test of the said mutual assisting junctions if their marking circuits are free, or to delay this test if the marking circuits are busy.

According to another feature of the invention, in combination in the above mentioned system, two or several receiving circuits cooperate with each of the primary groups, each receiving circuit being connectable to an incoming junction connected to this group via a selector associated to it, each of said receivers comprising means to cause the connection of said receiver to a calling junction via the associated selector; means to receive and register the information transmitted by the calling incoming junction on the required outgoing junction and means to cause the connection of said receiving circuit to a free marking circuit and to transmit to it the information on the required outgoing junction.

According to another feature of the invention, the marking circuit comprises separate means for the test of said mutual assisting junctions and the test of secondary groups, the two said means operating independently from each other and eventually simultaneously, in case the marking circuits of said mutual assisting junctions are not engaged by the other marker circuit.

Figure 1A:
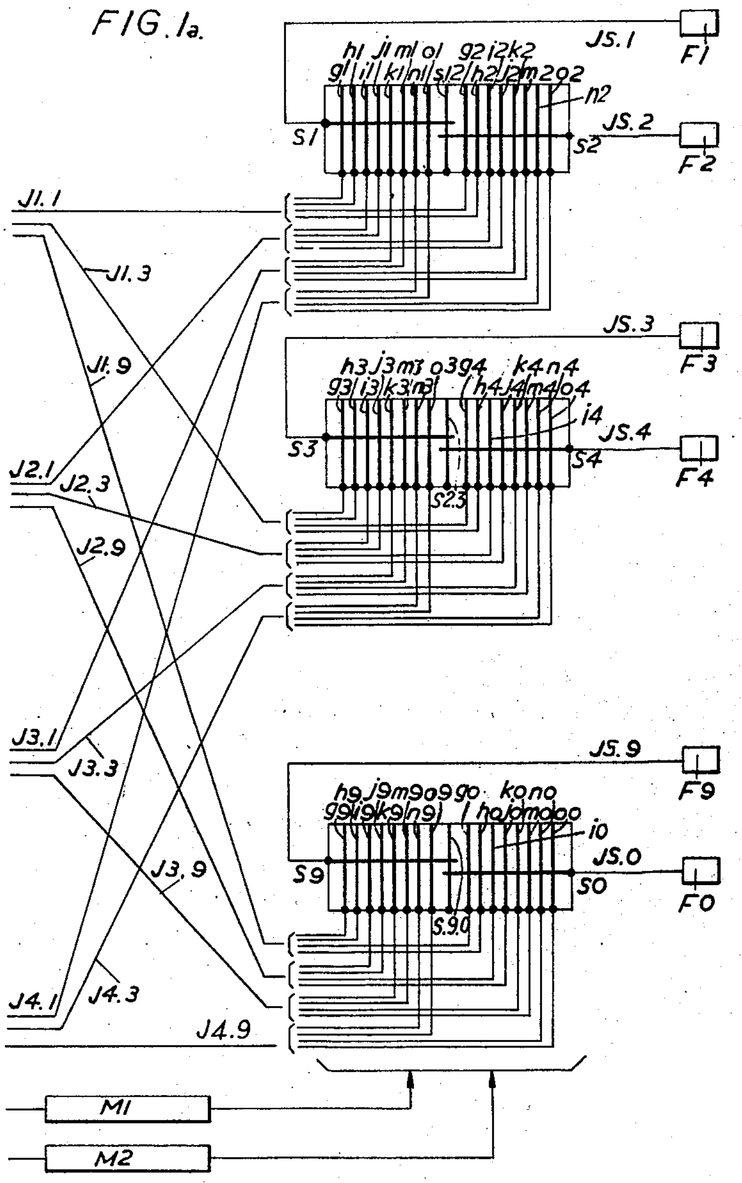
Figure 2:
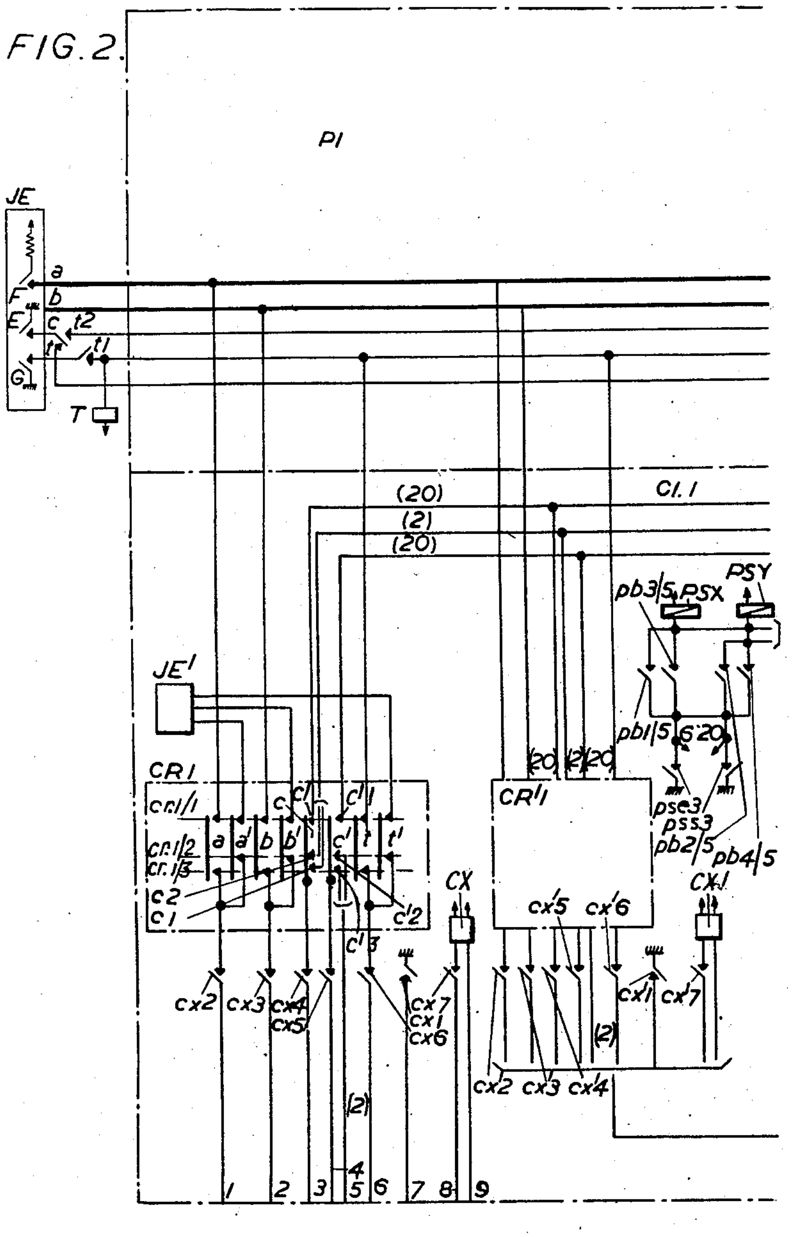
Figure 2A:
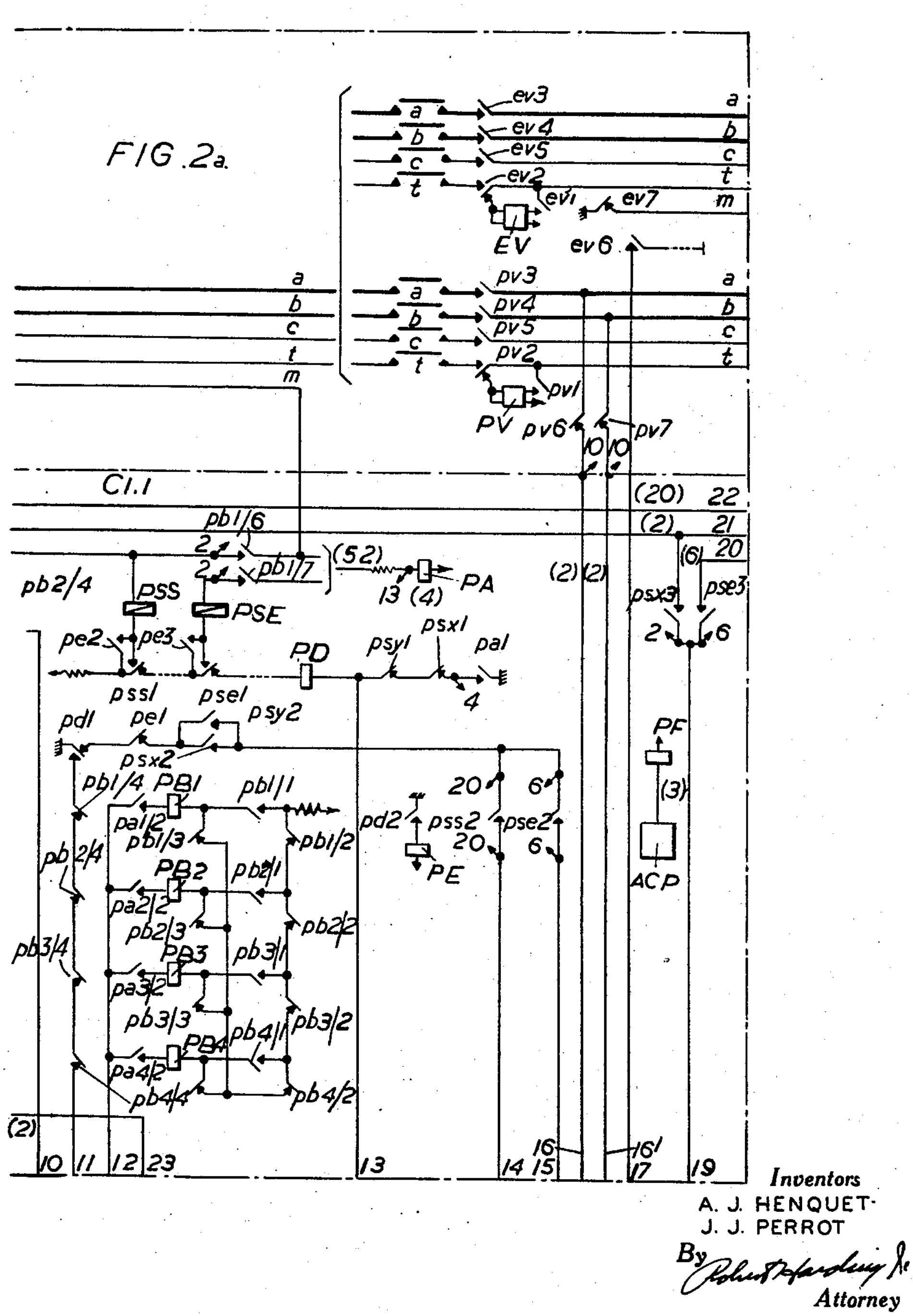
Figure 3:
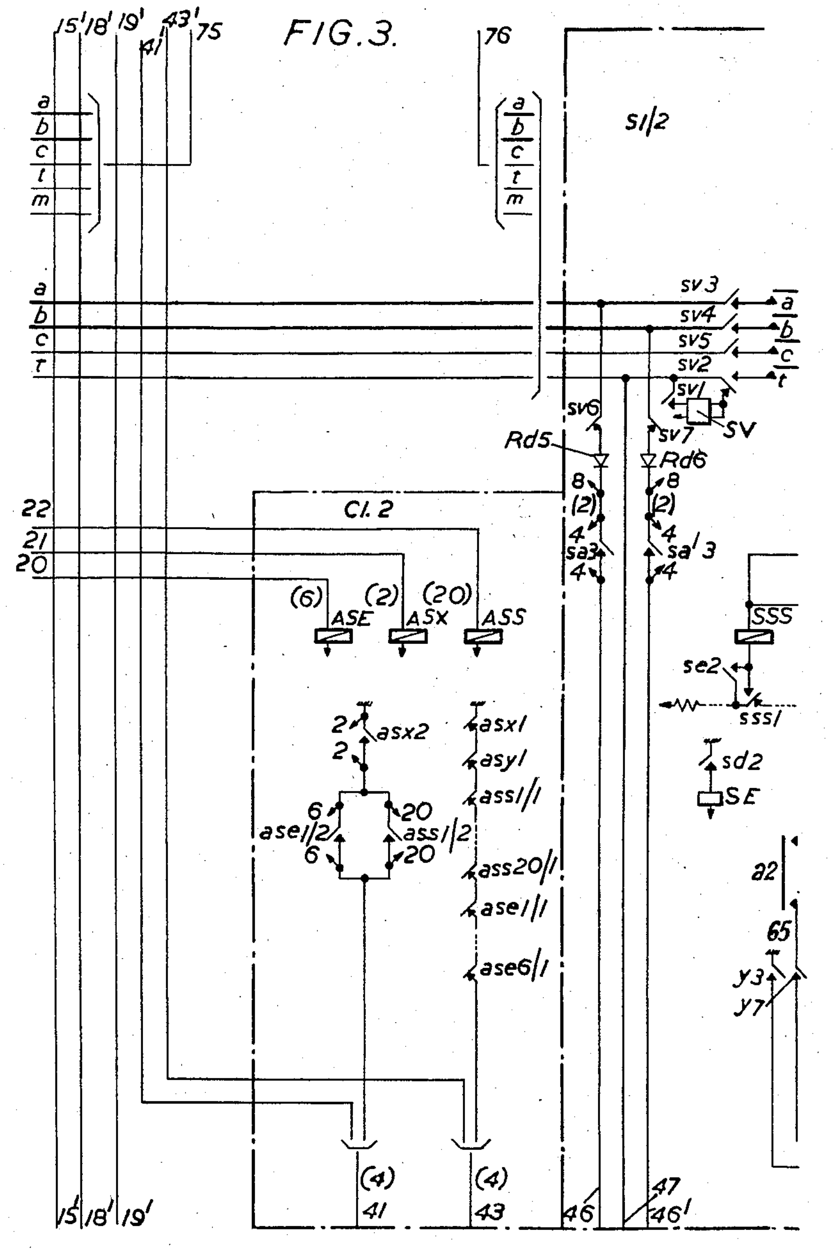
Figure 3A:
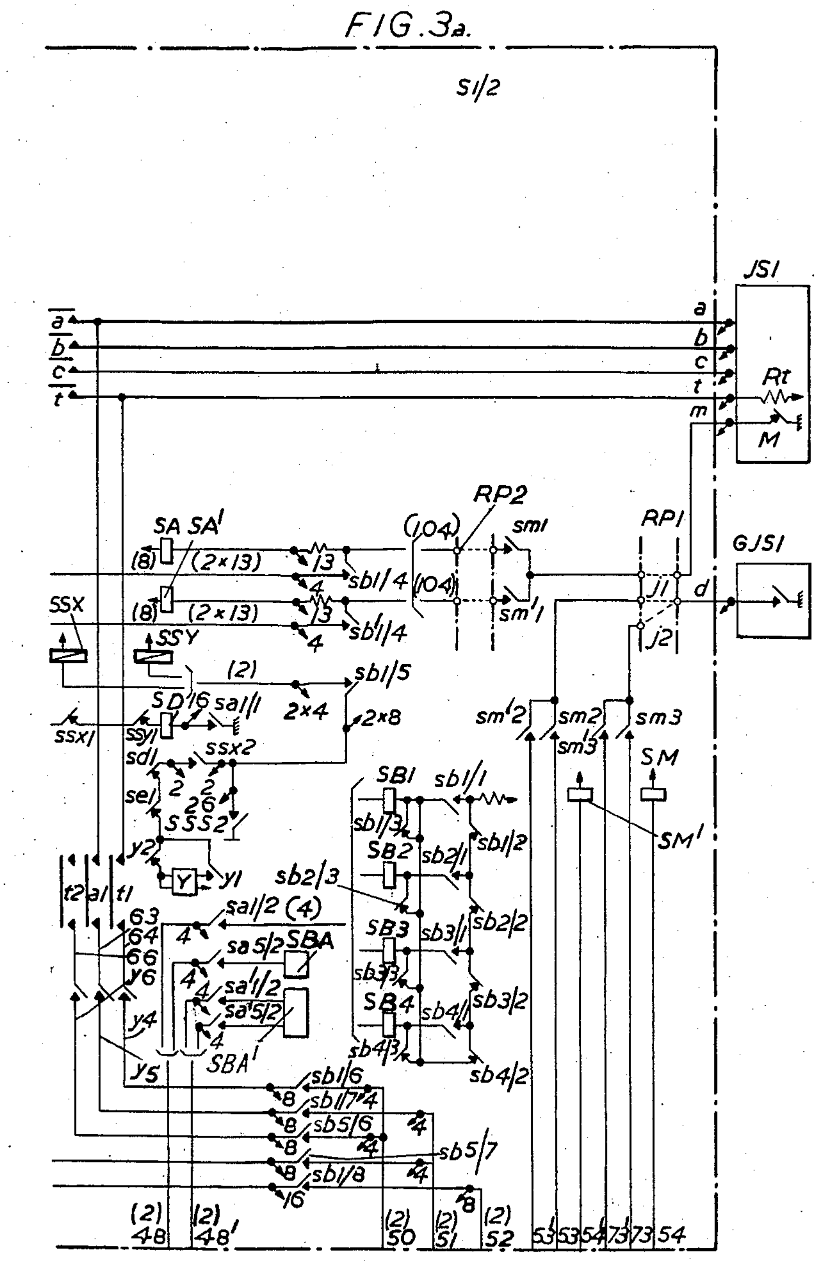
Figure 4:
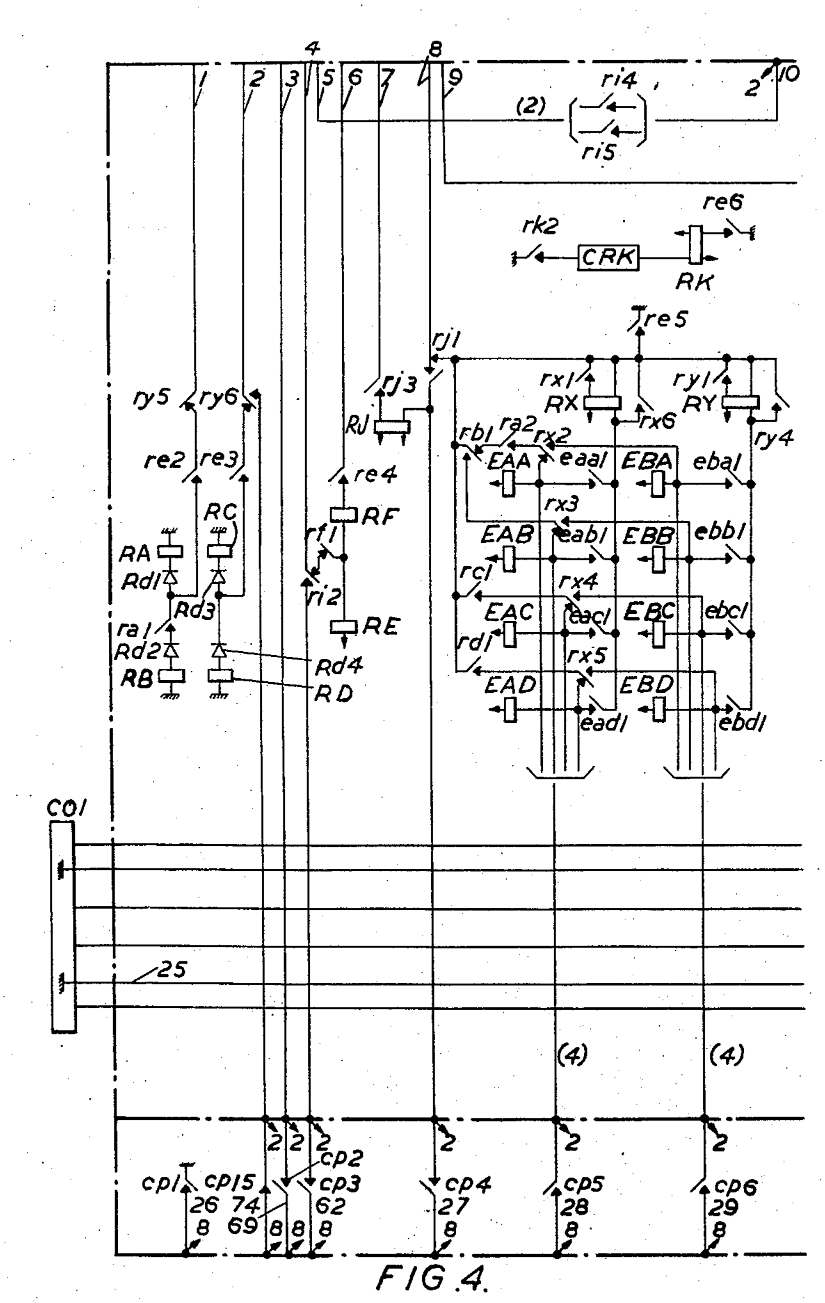
Figure 4A:
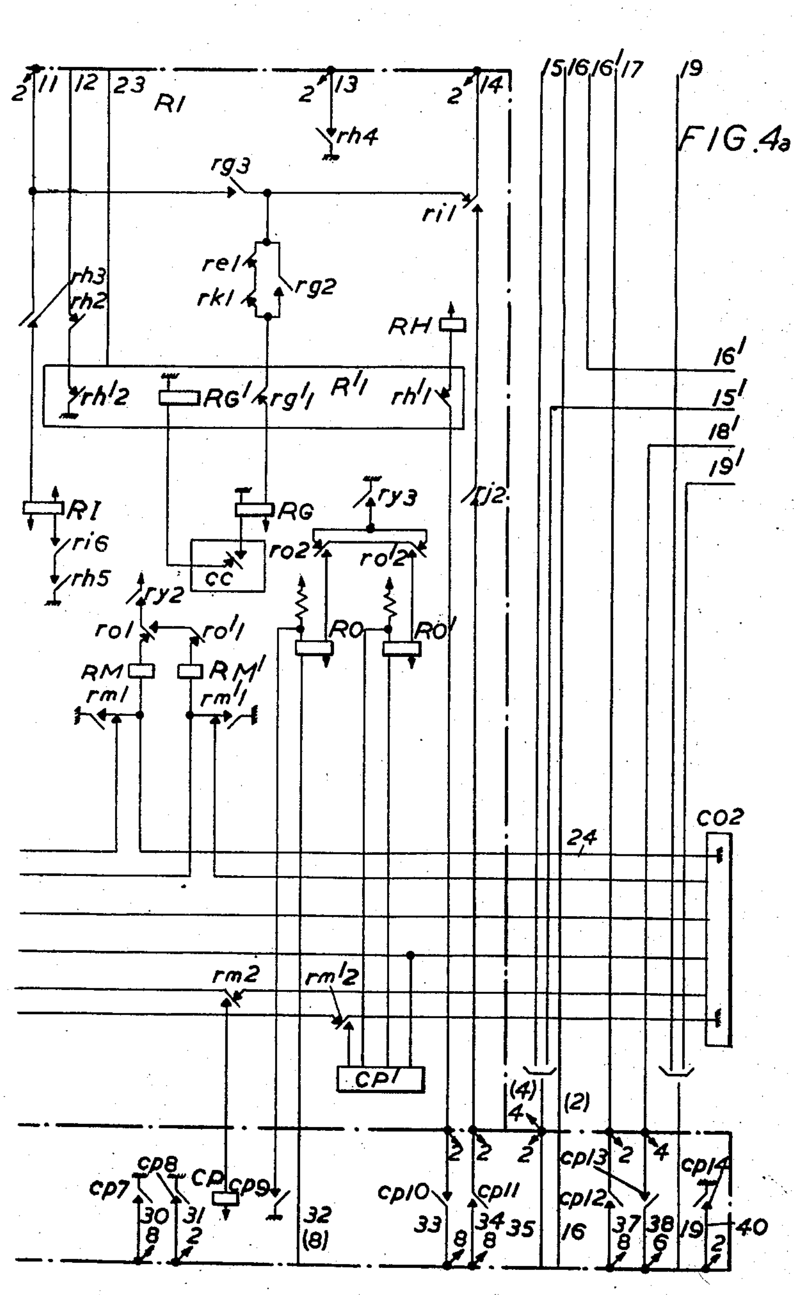
Figures 5, 10:
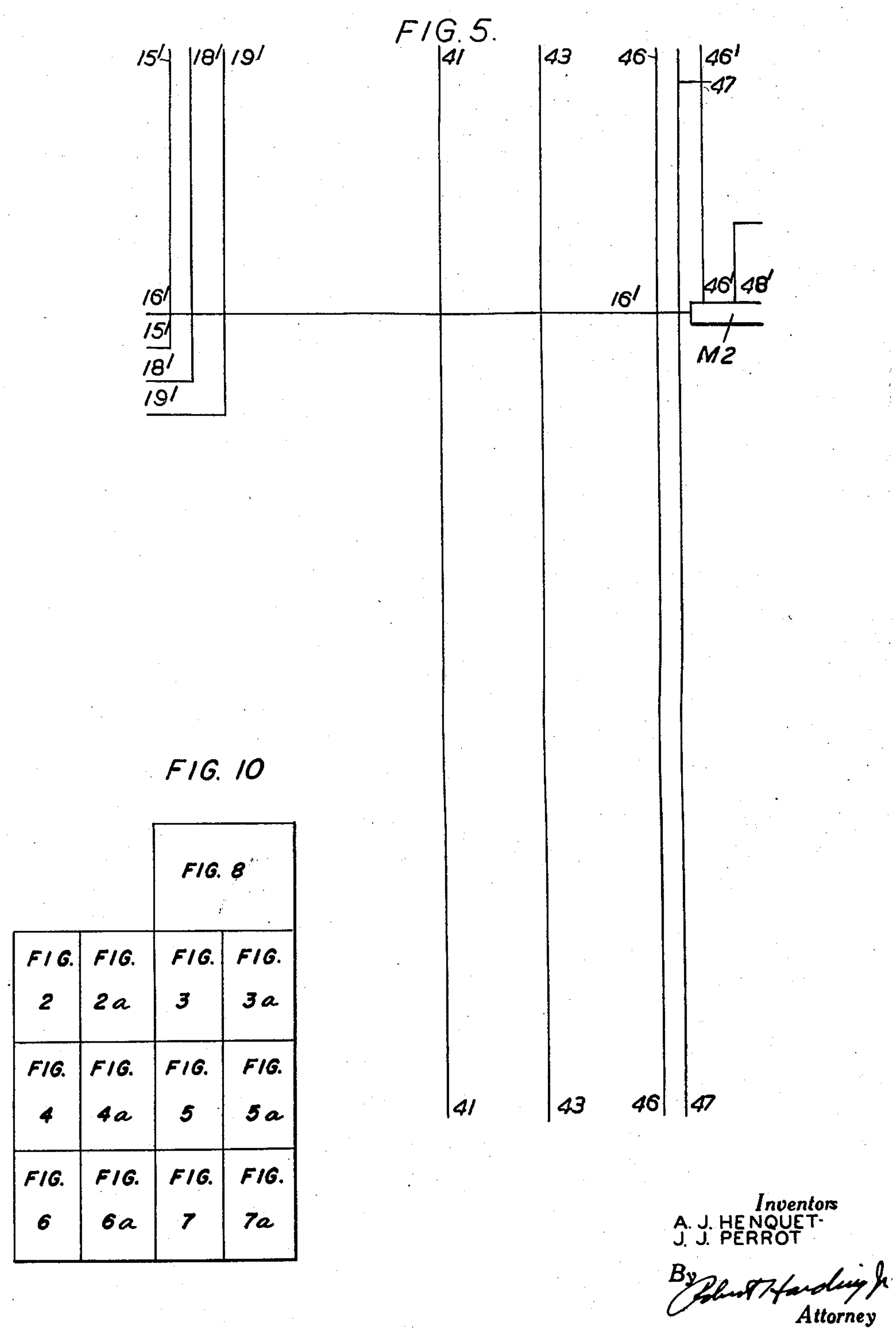
Figure 5A:
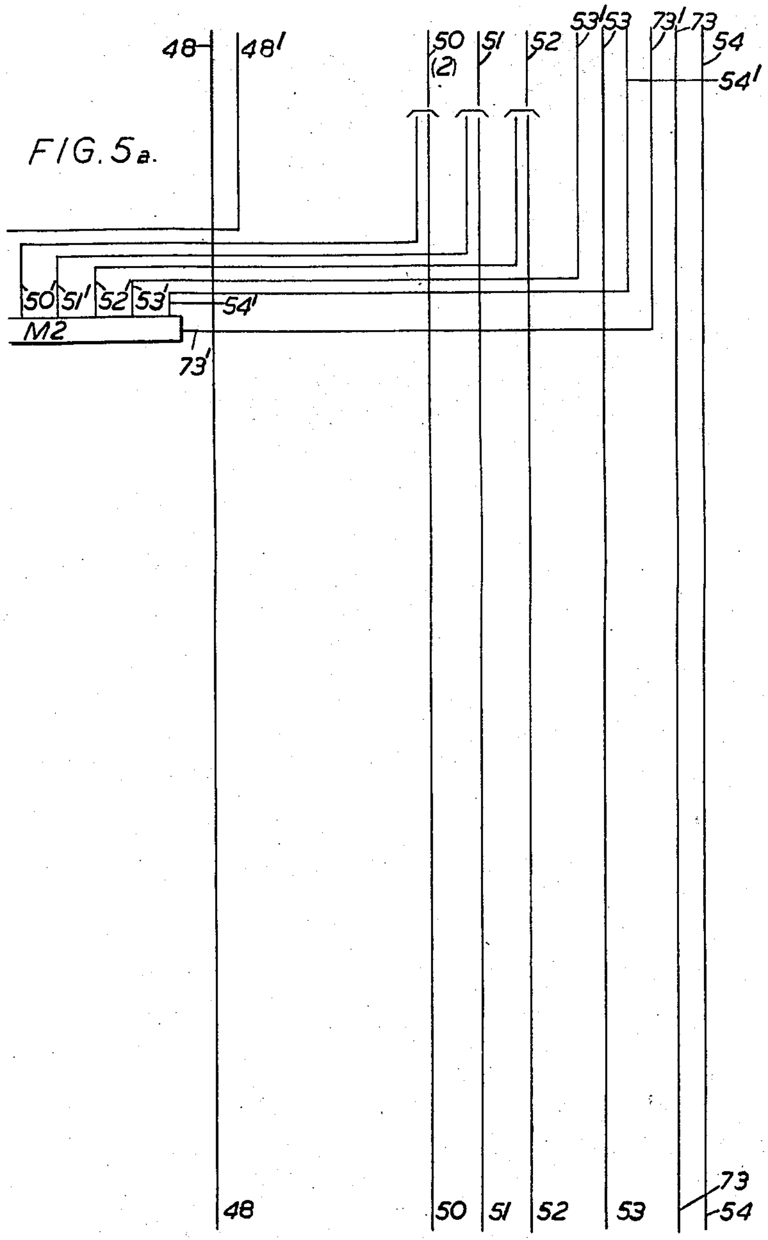
Figure 8:
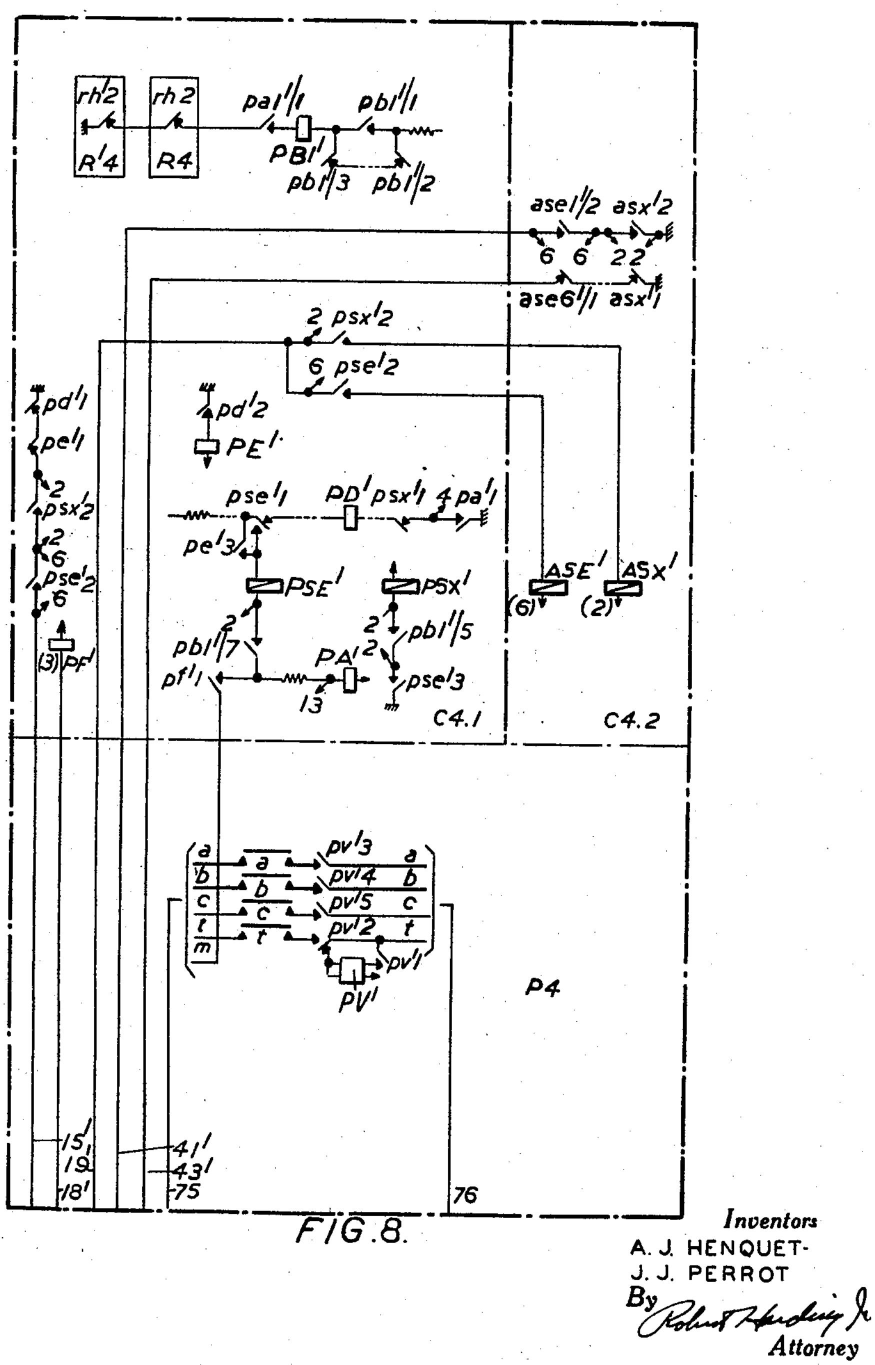
Figure 9:
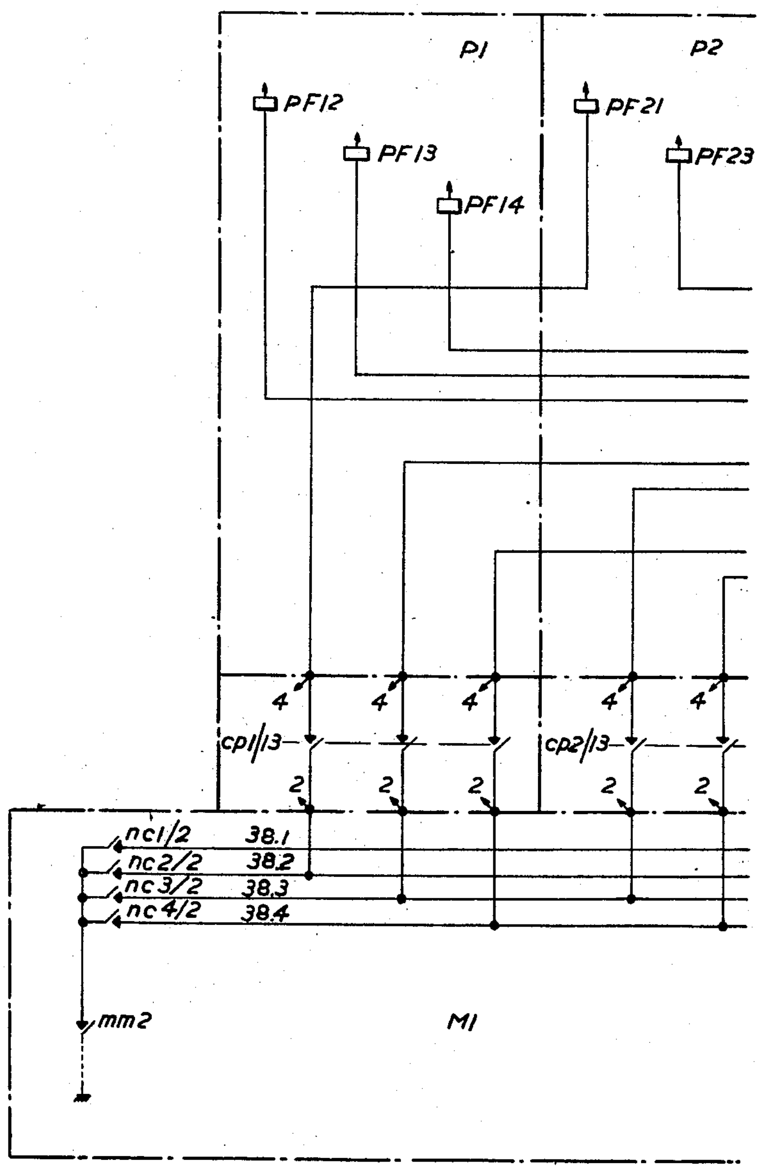
Figure 9A:
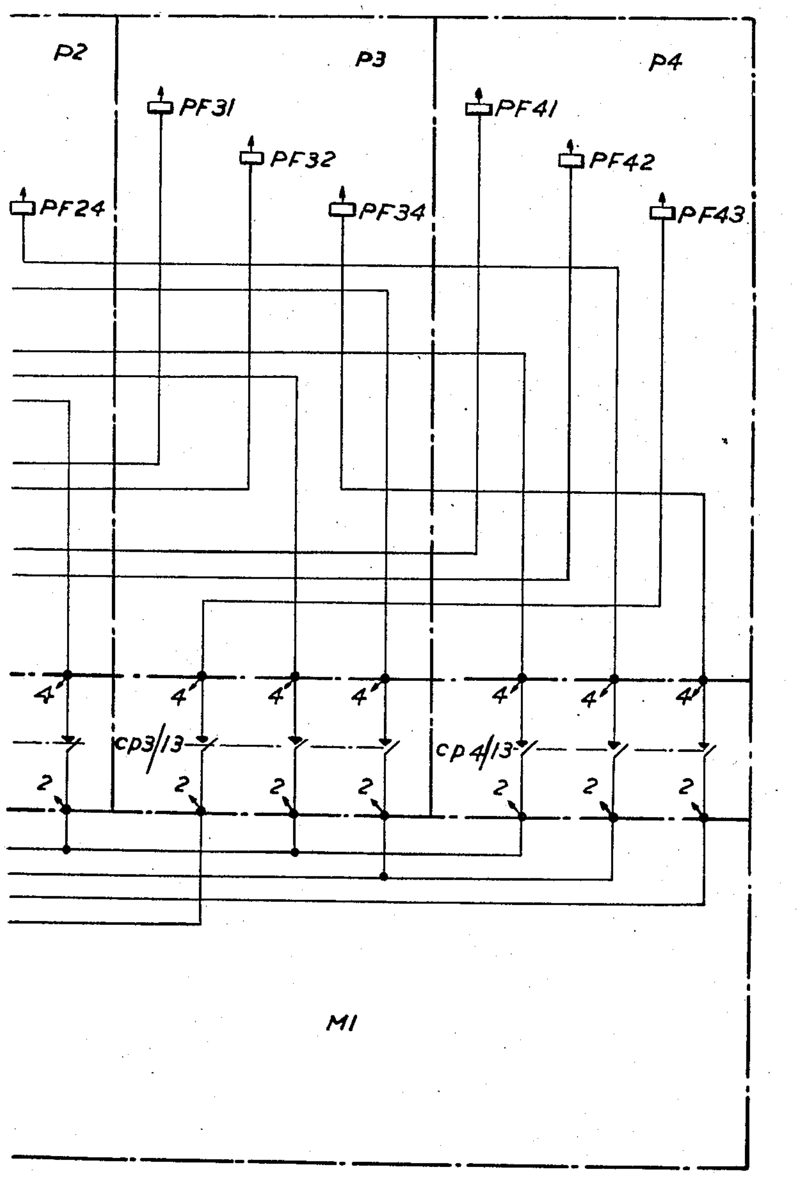

Other objects, features and advantages of the invention will be seen as the following description of an embodiment proceeds, the said description being made in relation to accompanying drawings, in which:

Figs. 1 and 1*a* show the junction diagram of an embodiment of an element for group selection embodying features of the invention;

Figs. 2, 2*a*, 3, 3*a*, 4, 4*a*, 5, 5*a*, 6, 6*a*, 7, 7*a* and 8 represent in detail an embodiment of an element for group selection and more particularly;

Figs. 2 and 2*a* represent the main frame of a calling primary group;

Figs. 3 and 3*a* represent the auxiliary frame of a calling primary group and the frame comprising two secondary circuit interruption;

Figs. 4 and 4*a* represent a receiving circuit and the associated connecting relay;

Figs. 5 and 5*a* show conductors connecting Figs. 2, 3, 4, 6, 7 and 8;

Figs. 6, 6*a*, 7 and 7*a* represent the marking circuit;

Fig. 8 represents the primary group selectors;

Figs. 9 and 9*a* represent the control circuit of relays PF used for mutual assistance of switches;

Fig. 10 represents the way in which the Figures 2 to 8 must be assembled.

The junction diagram of an element for group selection embodying features of the invention, has been shown on Fig. 1. This element for group selection utilizes cross bar switches constituted by vertical selectors. Each vertical selector comprises 52 levels and in the same frame there is arranged in groups, a number of vertical selectors the corresponding levels of which are multipled. In such embodiment, each frame generally comprises 17 vertical selectors. The 52 levels of each vertical selector are obtained by a well known manner, by means of 14 selection bars, 13 of these selection bars permitting 26 groups of two levels to be obtained, the choice between two levels obtained for a position of a selection bar being effected by means of the 14th selection bar used as a splitting bar.

As is well known with respect to cross-bar technique, each selection bar comprises two control electromagnets corresponding to the two possible positions of the bar independently of its rest position. In order to choose the level used in a frame, two selection electromagnets have to be actuated, that is to say: an electromagnet of a selection bar and one of the two electromagnets of the splitting bar must therefore be operated. The connection is then established by controlling the operation of the holding electromagnet of the vertical selector through which the connection will be established. Subsequently the control electromagnets of the selection bar and of the splitting bar are released and then can be used for the choice of another level in the same frame.

The element for group selection represented on Figs. 1 and 1*a* comprises four primary groups P1, P2, P3, and P4 to which the incoming junctions are connected, and ten secondary groups S1 . . . S0 to which the outgoing junctions are connected, the primary and secondary group being interconnected, as will be explained later, by internal junctions.

In order to simplify the representation, only the secondary groups S1, S2, S3, S4, S9 and S0 have been shown on Figure 1. The element for group selection receives information through the calling incoming junction permitting a control circuit called a marker to choose among the free outgoing junctions those corresponding to the requested direction. The marking circuit hunts for a connection between the incoming junction and the outgoing junction and establishes this connection. The element for group selection represented comprises two marking circuits M1 and M2. Each primary group P1, P2, P3, P4 is constituted by a numbr of vertical selectors such as *a*1, *b*1, *c*1, *d*1, *e*1, *f*1, in the primary group P1 which, according to their number, are grouped in one or several frames. In the circuit represented on Fig. 1, it has been assumed that two frames per primary group are used, a main frame such as C1.1 and an auxiliary frame such as C1.2 for the primary group P1, the other primary groups being identical. The levels of the vertical selectors of a same primary group are multipled. 40 of these levels, in the example under consideration, are used for the incoming junctions, the 12 remaining levels being used, as will be explained later, for assisting circuits between the different primary groups. All the primary groups are identical with the group P1 and the corresponding elements have been designated by the same references affected by an index, 1 for the circuit group P1, 2 for the circuit group P2, 3 for the circuit group P3, and 4 for the circuit group P4. The element for group selection under consideration can, therefore, serve $40\times4=160$ incoming junctions, only one of these junctions: JE.1, JE.2, JE.3, JE.4, having been represented per primary group.

Each secondary group is constituted by a number of vertical selectors, the levels of which are multipled and connected to the outgoing junctions. Each group of vertical selectors constituting a secondary group is equally associated, in the example under consideration, with a vertical selector used for the purpose of double testing and controlling. In the embodiment represented on Fig. 1*a* for each secondary group, eight vertical selectors *g*1, *h*1, *i*1, *k*1, *m*1,, *n*1, *o*1, are used for the secondary group S1, so that two secondary groups may be grouped on a same frame, the remaining vertical selector being used for the double test in the two secondary groups disposed on the same frame, *a*1.2 for the vertical selector associated with the secondary groups S1 and S2. It is assumed that ten secondary groups S1 . . . S0 are used in such a way, that the element for group selection serves $10\times52=520$ outgoing junctions. On Fig. 1*a*, there has been represented only one secondary junction JS1, JS.2, JS3, JS.4, JS.9, JS.0 respectively for each of the secondary groups S1, S2, S3, S4, S9, S0. The description has been made with reference to the secondary group S1; however, as the other secondary groups are identical, the corresponding elements in all the secondary groups have been designated by the same reference affected by the index corresponding to the secondary group.

However it must be understood that the data of the traffic may be such that eight vertical selectors are insufficient for serving the traffic and that a superior number of vertical selectors have to be used. In this case, only the vertical selectors of a same secondary group would be disposed inside of the same frame, and this modification will be obvious to those skilled in the art. The primary and secondary groups are interconnected by internal junctions. The two first selectors of each secondary group, such as S1, are connected by internal junctions, such as J1.1 to two vertical selectors of the primary group P1. The two following selectors of each secondary group are connected by internal junctions to the vertical selectors of the primary group P2, and so on. The junction groups J1.1, J1.3, J1.9 connecting the primary group P1 to the secondary groups S1, S2, S3, S4, S9, S0 have been represented on Fig. 1*a*. Each group of internal junctions such as J1.3 comprises four internal junctions respectively connecting the group P1 to two vertical selectors of each of the secondary groups S3, S4 mounted on the same frame, for instance the vertical selectors *g*3, *h*3 and *g*4, *h*4. The other groups of internal junctions J2.1/J2.9, J3.1/J3.9, J4.1/J4.9 connect the other primary groups to the different secondary groups, so that each primary group has direct access to any secondary group via two internal junctions. Of course, a different number of secondary groups comprising a different number of vertical selectors could be used. In this case, it will be easily understood that it would suffice to modify the number of primary selectors in keeping the same mode of repartition of the internal junctions, the vertical selectors necessary in each primary group being disposed in as many frames as required. In each primary group, two of the vertical selectors of the first frame, for instance, *a*1, *b*1, in the frame C1.1 of the group P1 are used to connect the incoming junctions to receiving circuits such as R1 and R'1. Each incoming junction such as JE.1, connected to the upper level of the primary group P1, is represented as being connected to a circuit B1 which can be an element for line selection, another element for group selection or a trunk incoming junction, and to a register E1 which comprises means to register indications upon the requested outgoing junction and to transmit them to the element for group selection. In the same way, each outgoing junction such as JS.1 is represented as being connected to a circuit F1 of outgoing junction which can be connected itself to another element for group selection, to a remote office or to a trunk outgoing junction. The circuits B2—E2, B3—E3, B4—E4, respectively connected to the incoming junction JE.2, JE.3, JE.4 are similar to the circuits B1 and E1 connected to the incoming junction JE.1 in the same manner as the circuits F2 . . . F0, respectively connected to the outgoing junctions JS.2 . . . JS.0 are similar to the circuit F1 connected to the outgoing junction JS.1.

As has already been stated, 12 of the levels of each of the primary groups are used for mutual assistance between the four primary groups and these levels cooperate with vertical selectors provided in the other primary groups. For that purpose, each vertical selector used for mutual assistance in a primary group for instance, *c*1 in the group P1, is connected to three levels used for mutual assistance *r*1.2, *r*1.3, *r*1.4 for instance, in the three groups P2, P3, P4, respectively.

It will be understood that, in such a way, an incoming junction, JE.2 for instance, connected to the primary group P2, can be connected to a secondary junction, JS.9 for instance, connected to the secondary group S9 through the vertical selector *c*2 of the primary group P2, the level *r*2.1 of the primary group *p*1, the vertical selector *f*1, the internal junction J1.9, one of the vertical selectors *g*9, *h*9 of the secondary group S9 and the level corresponding to the outgoing junction JS.9.

Therefore, it is always possible to hunt for a connection between an outgoing junction connected to a primary group and an outgoing junction connected to any secondary group via one of the other three primary groups.

The establishment of connections between an incoming junction and an outgoing junction will now be described. It will be assumed that the incoming junction JE.1 is calling. As soon as the call of a junction is detected, one of the receiving circuits R1, R'1 of the primary group P1 is connected to the incoming junction JE.1, causing successively the operation of the selecting electro-magnet and the electro-magnet of the splitting bar corresponding to the incoming junction, then the operation of the holding electro-magnet of the vertical selector connected to the receiver, for instance, the holding electro-magnet *a*1 corresponding to the receiver R1. Then, the receiver transmits to the register circuit E1 connected to the incoming junction JE.1 a signal to cause the transmission of the indications upon the requested outgoing junction by means of the register E1. Those indications, generally coded, are received and registered by the receiver R1 connected to the incoming junction. It will be understood that the connection between the receiving circuit and the incoming junction can only be established if the frame C.1 of group P1 is not busy by the establishment of a connection, as will be explained in the detailed description. As soon as the receiver circuit R1 is in possession of the indications necessary to identify the requested outgoing junction, it is connected to one of the free markers, M1 for instance. The indications registered by the circuit R1 are then transferred to the marker circuit. The different outgoing junctions, 520 in the example under consideration, are divided into groups corresponding to different directions. The marker circuit M1 determines from the indications received from the receiver circuit R1 the group of outgoing junctions corresponding to the requested direction and it marks each of the secondary groups having at least one free junction in the requested direction. Through circuits associated with each group and not represented in Fig. 1, the marking of said secondary groups causes the marking of the free internal junctions leading to secondary groups to serve the call.

The connections between the marker and the internal junctions are such that for each primary group the marker simultaneously tests a group of internal junctions (ten in the example under consideration) connecting the primary group under consideration to the ten secondary groups. This test is effected by means of relays, at the rate of one relay per group of ten internal junctions tested simultaneously, say two relays per primary group connected to the whole of the secondary groups through two groups of ten internal junctions. These test relays are interconnected so that only one relay can operate at a time, the preference being given to two relays corresponding to the primary group to which is connected the calling incoming junction served by this marker, and this, by means well-known in the art and which will be described in detail in relation to Figs. 2 to 8. The marker thus determines a primary group through which the call will be served, this primary group being the one to which the calling incoming junction is connected, if there is an internal junction between this primary group and a secondary group to which at least one free outgoing junction in the requested direction is connected. It should be noted that at the same time the marker chooses an internal junction among each group of two internal junctions between the primary group and each of the secondary groups. The marking effected from the secondary groups is then suppressed. Then, the marker effects a second test in order to determine which of the internal junctions (ten maximum in the example under consideration) will be used to serve the call and the vertical selector of this secondary group. For this purpose, the marker circuit marks the free internal junctions which have been determined during the first test. Moreover, the marker has access to the internal junctions by means of connections other than those used during the first test. The marker tests simultaneously the eight internal junctions leading to the same secondary group, one only among these junctions being able to be marked following the previous test. A test relay corresponds to each secondary group and those relays are interconnected so that only one relay can operate at a time. The secondary group which will be used for the connection to an outgoing junction in the requested direction is thus determined. If there are several free outgoing junctions corresponding to the requested direction which are connected to the secondary group chosen following the second test, a choice is made among these outgoing junctions by using conventional means. In the example under consideration, this choice is made by means of contacts associated with the control electro-magnets of the selecting bars, as will be explained in detail with reference to Figures 2 to 7. Following this choice, the electro-magnet of the selecting bar and the electro-magnet of the splitting bar which, in the chosen secondary group, determine the level of the outgoing junction which will be used for the establishment of the connection, are operated.

As the description proceeds, it will be assumed that the connection is established between the outgoing junction JE.1 and the outgoing junction JS.9 through the primary group P1, the internal junction J1.9 of the secondary group S9. Then, the marker causes the operation of the selecting electro-magnet and of the splitting electro-magnet which, in the primary group P1 determine the level to which is connected the incoming junction JE.1 and whose identity has been kept by the receiver R1 connected to the incoming junction JE.1. After effecting a test of the operation of the selecting and splitting electro-magnets in the primary group P1 and in the secondary group S9, the marker causes the operation of the holding electro-magnets of the vertical selectors corresponding to the chosen internal junction, J1.9 in the example under consideration, respectively in the primary group P1 and the secondary group S9. The connection is then established and kept under the control of means which will be described in detail further on. The marker M1 and the receiver R1 used for the establishment of the connection are then released.

The case of a connection established through a mutually assisting vertical selector belonging to a primary group other than the one to which the calling incoming junction is connected will now be considered. As stated above during the description of the first part of the test of the internal junctions leading to the choice of the primary group used for establishing the connection, the marker chooses preferably the primary group to which the calling incoming junction is connected, if there is a free internal junction connecting this primary group to a secondary group to which is connected a free outgoing junction in the requested direction. In the opposite case, the marker chooses another primary group, connected through free internal junctions to at least one secondary group to which at least one free outgoing junction in the requested direction is connected, for instance the group P3. The connection between the secondary group S9 to which the outgoing junction in the requested direction is connected, for instance JS.9, will be established through the internal junction J3.9, as has been explained in reference to the establishment of the connection between the primary group P1 and the secondary group S9. For the connection between the primary group P3 and the primary group P1 through a mutually assisting junction, the marker hunts for a free junction among the mutually assisting junctions connected to the levels of the primary group P3. This hunting which is effected by means of the selecting electro-magnets, as will be explained during the detailed description, is controlled by the marker circuit, as well as the hunting for a secondary group and for a free outgoing junction in the requested direction in this secondary group.

When the different selecting electro-magnets, in the different circuit groups used for the connection, have been placed in position, the marker causes the operation of the electro-magnets of the vertical selectors and the connection is maintained under the control of the incoming junction. The marker circuit and the receiving circuit which have been used are then released.

The establishment of a connection between an incoming junction and an outgoing junction in the requested direction has been made by considering only one marker circuit. The element for group selection represented in diagram in Fig. 1 and in detail in Figs. 2, 3, 4, 5, 6, 7 and 8 comprises two markers which may operate simultaneously in connection with the same groups in most of their functions, except the control of the electro-magnets of the selecting and holding bars. For the marking of the free outgoing junctions in the requested direction, the marking circuits controlled by the markers are independent. As has been stated above, the marking of the free junctions in a requested direction causes, through circuits associated to the secondary groups, the marking of internal junctions leading to secondary groups to which free outgoing junctions in the requested direction are connected. The marking circuits of internal junctions are provided independently for each marker. Each internal junction comprises two speaking wires and one or several control wires (two in the example considered in Figs. 2 to 8) and two different conductors are used for the marking circuits controlled by the two markers. This separation of the marking circuits controlled by the marking circuits M1 and M2 enables these circuits to operate independently from each other, eventually in connection with the same groups, for the hunting for an internal junction liable to serve the two calling incoming junctions under the control respectively of the two markers. In the described embodiment, the marking circuits for the mutually assisting junctions have not been separated, so that the two markers cannot operate independently for the hunting for such a junction. Means have been provided in each of the marking circuits M1 and M2, so that when one of the marker circuits, M1 for instance, wants to hunt for mutually assisting junction between two secondary groups, it will check that the other marking circuit M2 has not started to hunt for such a connection. If such a hunting is proceeding, the marking circuit M1 waits for the marker circuit M2 to have completed its hunting. However it will be understood that it could also be possible to provide a separate marking circuit, for each marking circuit on the mutually assisting junctions as well as the internal junctions; however, in the example under consideration as the traffic routed through the mutually assisting junctions is low compared with the total traffic, this method is not employed, the probability of a simultaneous hunting for an auxiliary junction by the two markers being too small.

It will be considered now the case of the establishment of direct connections (i.e., without using mutually assisting junctions) when each marker has determined the internal junction which will be used to serve the call. At this stage of the operation, each marker tests, before controlling the operation of the selecting and splitting electro-magnets, that the oher marker circuit does not establish a connection in the same frame. Different cases must then be considered.

Distinct test circuits are provided in each marker for the primary groups and the secondary groups. The case of the secondary groups will be considered first.

If the test effected by the marking circuit shows that the other marking circuit does not effect or does not want to effect a connection in the same secondary group, the marking circuit marks the secondary group so as to busy it, this marking being effected in the marking circuit.

If the test shows that the other marking circuit effects a connection in the requested secondary group, the effected selection is cancelled and a new selection is made after modifying the order of priority of the secondary groups so as to hunt for another secondary group, if any to which at least one free outgoing junction in the requested direction is connected.

If the two marking circuits wanting to effect a connection in the same secondary group effect the test at the same time, the selections effected by the two marking circuits are cancelled and each marking circuit causes a new selection after modifying the order of priority of the secondary groups.

These two last cases are normally completed by an operation identical to the operation described in the first case, i.e., by the busying of a secondary group to which a free outgoing junction in the requested direction is connected.

It will be considered now the case of a test effected in connection with the primary groups.

If the primary group to which the junction is connected is free, the marking circuit which has also busied a secondary group to which an outgoing junction in the requested direction is connected, causes the establishment of the connection.

If the other marking circuit effects a connection in this primary group, the establishment of the connection by the first marking circuit is deferred, as the delay brought to the establishment of the connection is limited to the time required to the other marker to establish the connection.

If the two marking circuits effect the test at the same time, the establishment of the connection by one of the marking circuits is deferred, the other marking circuit effecting normally the connection. As soon as the primary group is no more busied by this marker, the other marker can control the connection.

The connection between a calling incoming junction and an outgoing junction in the requested direction, can also be established through a mutually assisting junction, as has been stated above. In this case, the test effected by the marker before controlling the operation of the selecting electro-magnet is effected simultaneously for the two primary groups used. When at least one of the two primary groups is busied by the other marking circuit controlling a connection in it, the operation of the first marking circuit is deferred until the primary group interruption or the two primary groups is freed.

In such switching systems, a single marking circuit can control a connection in a frame, this restriction being due to the fact that the selecting and splitting bars are common to all the selectors of the frame. Therefore, when a group comprises several frames whose splitting and selecting bars can operate independently, it is generally possible for two marking circuits to control connections within the same group, provided that these connections are effected by using connecting and splitting bars belonging to different frames. In the example under consideration, two frames are used per primary group and means are therefore provided in each marking circuit to enable the establishment of such connections by the two marking circuits, as will be explained in the detailed description of Figs. 2 to 8.

In the description of the operation, it has been considered in order to simplify the explanation, that the establishment of the connection between the incoming junction and the requested outgoing junction was always accomplished. It will be considered now certain particular cases in which the connection cannot be established.

If all the outgoing junctions in the requested direction are busy, two cases must be considered depending on whether the requested direction has or not an overflow path. If the requested direction has an overflow path, the marking circuit transmits a characteristic signal to the register circuit connected to the incoming junction. Then, the register circuit may cause the release of the engaged chain and attempt the establishment of the connection by the overflow path. In the opposite case, the marking circuit transmits to the register a busy tone which is used by the register to cause the release of the chain.

If the marking circuit cannot find a connection between the primary group to which the incoming junction is connected and a secondary group to which is connected at least one outgoing junction in the requested direction either directly or through a mutually assisting junction, the marking circuit transmits to the register connected to the incoming junction, a characteristic signal, so that the last causes the release of the engaged chain.

It will be described now in detail with reference to Figs. 2 to 8 the operation of an element for group selection embodying the invention and corresponding to the junction diagram of Fig. 1. In Figs. 2 to 8, the mode of representation known under the name of "detached contacts" has been used for the switching devices. The windings of the relays or electro-magnets are designated by one or several capital letters and the corresponding contacts are designated by the same small letters bearing an index. When several relays are used for identical functions, for instance in connection with different groups, these relays have been designated by the same capital letters bearing an index and the corresponding contacts have been indicated by the same small letters, the index of the relay being separated from the index of the contact by a slanting stroke, for instance the contact *pa*1/2 of the relay PA.1.

A calling incoming junction, JE, for instance, is characterized by a ground on its wire *c*, which causes the operation of the calling relay PA by means of the circuit: ground a contact E, for instance, of the register, wire *c*, break contact *t*2, wire *m*, decoupling resistance, calling relay PA, battery. The relay PA is common to thirteen levels of a primary group corresponding to the same position of the splitting bar and the selecting electro-magnets of the same kind, i.e., whose excitation causes toe rotation of the corresponding bar in the same direction. So, there are four relays, PA.1, PA.2, PA.3, PA.4, per primary group and it will be assumed that the operated relay, which has been represented on Fig. 2, is the relay PA.1. This repartition is indicated on Fig. 2 by the arrow of multiplying bearing the index 13 and by the digit (4) facing the relay PA. The dialing relay PA causes the operation of the relay PD which controls the state of rest of all the electro-magnets of the horizontal selecting and splitting bars by means of the following circuit: ground make contact *pa*.1, break contacts *psx*.1 and *psy*.1, relay PD., chain of break contacts *pse*.1 . . . *pss*.1, resistance, battery.

One of the relays PB.1, PB.2, PB.3, PB4 corresponding respectively to the four delays PA, operates by means of the following circuit: ground, break contact *rh'*.2 (Fig. 4) in the receiving circuit R'1 and break contact *rh*.2 in the receiving circuit R1, wire 12, make contacts *pa*.1/2, delay PB.1, break contact *pb*.1/3, break contacts *pb*.4/2, *pb*.3/2, *pb*.2/2, *pb*.1/2, resistance, battery. Only one receiving circuit has been represented in detail on Fig. 4 and within the frame R'1 only the contacts of the second receiver which operate necessarily with the first receiver have been represented. The relay PB.1 operates and is held by its make contact *pb*.1/1 and prevents through its break contacts *pb*.1/2 and *pb*.1/3 the possible excitation of the other relays PB.2, PB.3, PB.4. A group of thirteen levels to which are connected junctions among which there is at least one calling junction is thus determined, the thirteen levels thus determined corresponding to the thirteen selecting electro-magnets which cause the rotation in the same direction of the corresponding bars. The excitation of the relay PD causes the excitation of the relay PE through the closure of the make contact *pd*.2, the relay PE, through its make contacts such as *pe*.2 and *pe*.3, closes the battery circuits of the selecting electro-magnets such as PSS and PSE. A selecting electro-magnet PSS corresponding to the calling incoming junction operated by means of the following circuit: ground of the wire *c* of the calling incoming junction and break contact *t*2, wire *m*, make contact *pb*.1/6, selecting electro-magnet PSS, make contact *pe*.2, battery. The selecting electro-magnet PSS closes its holding circuit through the make contact *pss*.1 and cuts through the break contact *pss*.1 the battery of the electro-magnets placed upon the chain and the operating circuit of the relay PD. The chain of contacts (Fig. 2) comprising contacts such as *pse*.1, selecting electro-magnets such as PSS and contacts such as *pse*.1, electro-magnets PSE, is arranged so that a single selecting electro-magnet can be operated at a time, with the result that when several junctions are calling in the same group, two levels corresponding to the electro-magnet PSS which remains operated are then chosen. It should be understood that the multiple indicated by the arrow bearing the number 2 indicates a control circuit similar to the one represented and which is connected to the wire *m* of the other junction. In case the two junctions connected to two levels associated to the same selecting electro-magnet are calling simultaneously, it should be understood that the ambiguity is suppressed by which one of the relays PB.1, PB.2, PB.3, PB.4 remaining operated. The relay PD falls back and de-energizes the relay PE through the opening of the make contact *pd*.2. The relay PE as it is de-energized opens through make contacts such as *pe*.2 the battery circuits of the electro-magnets PSS so that none other of these electro-magnets can operate. The operated relay PB determines the electro-magnet of the splitting bar which must operate. During the operation of a selecting electro-magnet such as PSS, the splitting electro-magnet PSX for instance operates by means of the following circuit: ground, make contact *pss*.3, make contacts *pb*.1/5 splitting electro-magnet PSX, battery. Each of the selecting electro-magnets PSX and PSY of the splitting bar is respectively controlled by two contacts *pb.1/5—pb.3/5* and *pb.2.5—pb4/5*. It will be understood that the relays PB.1 and PB.3 corresponding to the relays PA.1, PA.3 are associated to 26 levels which are obtained for the position of the splitting bar corresponding to the operation of the electro-magnet PSX. In the same way, the relays PB.2 and PB.4 corresponding to the relays PA.2 and PA.4 are associated to 26 levels obtained for the other position of the splitting bar (electro-magnet PSY operated). The operation of an electro-magnet PSS and of an electro-magnet PSX effects the selection for the level to which the calling incoming junction is connected and when the relay PD is de-energized, the relays RG of the two receivers R1 and R'1 are supplied by means of the following circuit: ground, break contact *pd.1* (Fig. 2), break contact *pe.1*, make contact *psx.2* or *psy.2* according to the position of the splitting bar, make contact *pss.2* corresponding to the operated selecting electro-magnet, wire 14 (Figs. 2 and 4), break contacts *ri.1*, *re.1*, *rk.1* in the receiver R1, break contact *rg'.1* in the receiver R'1, relay RG of the receiver R1. As indicated by the arrow of multiple on the conductor 14 at the input of the receiver R1 (Fig. 4), an identical circuit is provided in the receiver R'1, this circuit passing through a contact *rg.1* in the receiver R1 identical to *r'g.1* of the receiver R'1. It should be understood that, as a result of these connections and in case the two receivers R1, R'1 are free, which is characterised by the rest of the relays RE and RK, a single relay RG can be maintained operated. The relay RG of each of the receivers has a second winding which is alternatively short-circuited so as to delay alternatively one of the relays RG with regard to the other. Thus, a receiver will always have priority upon the other. The ground enabling to short-circuit either the second winding of the relay RG, in the receiver RI, or the second winding of the relay RG', in the receiver R'1, is provided by a reverse contact CC which can be controlled by well-known means, for instance by reversing the position of the contact CC after the seizure of a receiver.

Groups of contacts which are respectively operated by the control electro-magnets CX and CX' of the vertical selectors respectively associated to the receivers R1 and R'1 have been represented on the left of Fig. 2 and within the frames in dot and dash lines CR1 and CR'1. Only the contacts of the frame CR1 have been represented in detail. Each group of contacts such as CR.1 comprises three contact assemblies *cr.1/1*, *cr.1/2*, *cr.1/3*. The contact assembly *cr.1/1* is under the control of a position of the selecting bar corresponding to the incoming junction under consideration and to the associated incoming junction JE'. The choice between these two junctions is effected by controlling the associated splitting bar which, depending on whether it is in a make position or in the other, enables the control of the contact assembly *cr.1/2* or *cr.1/3*. Only the wires *a*, *b* and *t* of the incoming junction are connected to the associated groups of contacts CR.1, CR'1. The banks *c* and *c'* for instance in the group CR.1 are used to identify the incoming junction served by the corresponding receiver R1. This identification is obtained by characterizing the operated selecting electro-magnet and one of the electro-magnets of the splitting bar. Each vertical selector associated to a receiver comprises twenty contacts such as *c1* corresponding to the twenty contact assemblies such as *cr.1/1* associated respectively to the twenty selecting electro-magnets of the levels to which the incoming junctions are connected. The vertical selector controls also the contacts *c2* and *c3* associated to the two electro-magnets of the splitting bar, 20+2 conductors are consequently provided for, and two of these conductors corresponding to a selecting electro-magnet and a splitting electro-magnet can be marked through conductor 3, as will be explained later on. The twenty conductors characterizing the selecting electro-magnets are respectively connected, through wires such as 22 (Figs. 2 and 3) to the selecting electro-magnets ASS (Fig. 3), belonging to the auxiliary frame of the primary group under consideration. The two conductors characterizing the electro-magnets of the splitting bar are respectively connected through conductors such as 21 (Figs. 2 and 3) to the two electro-magnets such as ASX of the splitting bar. It should be understood that, by applying a ground to the conductor 3 and after the closure of the make contact *cx.4*, the operation of a selecting electro-magnet and a splitting electro-magnet of a frame of the associated primary group, the primary group P1 in the case under consideration, will be controlled. As stated above, each primary group comprises, in the example under consideration, a main frame and an auxiliary frame. On Figs. 2 and 3, the devices associated to the main frame of the primary group P1 have been represented within the frame, in dot and dash line C1.1 (Fig. 2), and within the frame in dot and dash line C1.2 (Fig. 3), the devices associated to the auxiliary frame of the primary group P1. Moreover, in order to simplify the representation, only one vertical selector PV which will be used with reference to the two frames of the group P1, has been represented. Considering again the block of contacts CR.1 of the vertical selector associated to the receiver R1, it should be understood that the contacts such as *c1*, *c2*, *c3*, control the selections in the auxiliary frame, the contacts *c'1*, *c'2*, *c'3* fulfill similar functions as regards the main frame. However, the control of the splitting electro-magnets is also subordinated to the operation of the relay R1 of the receiver (Fig. 4), as will be explained later on. The groups of contacts such as CR'1, controlled by the vertical selector CX', associated to the receiver R'1, are connected in parallel with the corresponding contacts of groups such as CR.1. In order to simplify the representation, only one conductor 23 between the group of contacts CR'1 and the receiver R'1 (Fig. 4) has been represented. As will be disclosed as the description proceeds, such an arrangement allows the simultaneous establishment, through the two marking circuits, of two connections in the same group, but in two different frames. It should be understood that such an arrangement would also be applicable to a primary group comprising more than two frames and in this case, a bank of supplementary contacts such as *c1*, *c2*, *c3* per supplementary auxiliary frame would have to be provided.

As stated above, the relay RG of one of the receivers, R1 for instance, operates indicating that the corresponding receiver will be used to serve the call. Through its make contact *rg.3* the relay RG closes the operating circuit of the electro-magnet CX: ground, break contacts *pd.1* and *pe.1* (Fig. 2), make contacts *psx.2* or *psy.2* (according to the splitting electro-magnet used), make contact *pss.2* (of the selecting electro-magnet used), the twenty contacts such as *pss.2*, connected in parallel (corresponding to the 20 selecting electro-magnets associated to incoming junctions), wire 14 (Figs. 2 and 4), break contact *ri.1*, make contact *rg.3*, wire 9 (Figs. 4 and 2), right winding of the electro-magnet CX, battery. The operation of the electro-magnet CX causes the connection of the wires *a*, *b* and *t* of the calling junction to the corresponding wires of the receiver respectively through the contacts *cx.2*, *cx.3*, *cx.6*. The make contacts *cx.2*, *cx.3* and *cx.6*, which are in the circuits of the wires *a*, *b*, *t*, are provided so as to be closed after the contacts of the vertical selector in order to protect them during the establishment or the disconnection of the current. The relay RE of the receiver operates by means of the following circuit: ground, wire *c* of the incoming junction, break contact *t2*, wire *m*, make contact *pb.1/6*, contact *c'1* of the group of contacts CR.1, make contact *cx.5*, wire 4 (Figs. 2 and 4), break contacts *ri.2*, *rf.1*, relay RE, battery. The relay RE marks the seizure of the receiver and its operation is always caused by a calling incoming junction. Through its break contact *re.1*, it opens the operating circuit of the relay RG which marks the seizure of the receiver by an incoming junction. The relay RG is held until the connection of the incoming junction to the receiver through its make contact *rg*.2 is completed. Through its make contact *re*.2, the relay RE connects the code receiving relay RA to the wire *a* of the incoming junction by means of the following circuit: ground, relay RA, rectifier cell R*d*1, make contact *re*.2, break contact *ry*.5, wire 1 (Figs. 4 and 2), break contacts *cx*.2, contacts *a* of the group of contacts CR.1 and wire *a* of the incoming junction. In the same way, the relays RC and RD, respectively in series with the rectifier cells R*d*3, R*d*4 connected in the reverse direction, are connected to the wire *b* of the incoming junction by: make contact *re*.3, break contact *ry*.6, wire 2 (Figs. 4 and 2), make contact *cx*.3 contact *b* of the group of contacts CR.1, wire *b* of the incoming junction.

The relay RE closes its make contact *re*.4 and extends then the ground of the break contact *rf*.1 towards the relay T of the incoming junction by: operating ground of the relay RE to the break contact *rf*.1, marginal relay RF, make contact *re*.4, wire 6 (Figs. 4 and 2), make contact *cx*.6, contact *t* of the group of contacts CR.1, relay T of the incoming junction, battery. The marginal relay RF (Fig. 4) does not operate in series with the relay T (Fig. 2). Through its make contact *t*1, the relay T is held on the general ground of the wire *t* of the incoming junction and extends this ground to the relay RF by: ground to the contact G of the incoming junction, make contact *t*1, contact *t* of the group of contacts CR.1, make contact *cx*.6, wires 6 (Figs. 2 and 4), make contact *re*.4. The relay RF short-circuited by the operating ground of the relay RE does not operate. Through its reverse contact *t*2, the relay T of the incoming junction opens the circuit of the wire *m* and causes on one hand the de-energizing of the pilot relay PA and of the selecting electro-magnet PSS and on the other hand, suppresses the control ground of the relay RE. The short-circuit of the relay RF disappears and this relay operates and is held in series with the relay RE. The de-energization of the pilot relay PA causes the de-energization of the relay PB.1 through the opening of the make contact *pa*.1/2 and the de-energization of the selecting electro-magnet PSS causes the de-energization of the splitting electro-magnet PSX through the opening of the make contact *pss*.3. The operating circuit of the relay RG (Fig. 4) being opened by the make contacts psx. 2 and pss. 2, this relay is de-energized closing a contact, similar to the contact *rg'*1, which controls the operating circuit of the relay RG' of the other receiver which will be able to be seized by a calling junction. The make contact *re*.5 connects a ground which holds the connector CX (Fig. 2) by means of the following circuit: ground, make contact *re*.5, break contact *rj*.1, wire 8 (Figs. 4 and 2), make contact *cx*.7, left winding of the electro-magnet CX and battery. The make contact *re*.6 causes the operation of the relay RK. The relay RK marks the busying of the receiver. Through the operation of the relay RE[a], ground is connected on the wire *b* of the incoming junction by means of the following circuit: ground, relay RD, rectifier cell R*d*4, make contact *re*.3, break contact *ry*.6, wire 2 (Figs. 2 and 4), make contact *cx*.3, contact *b* of the group of contacts CR.1 and wire *b* of the incoming junction. This ground causes in the register circuit the starting of the code-sending device. These codes are sent on the wires *a* and *b* under the form of positive or negative polarities. These polarities cause the operation of the code receiving relays RA, RB, RC, RD of the receiver (Fig. 4) in the following way:

(*a*) The application of a positive voltage on the wire *a* causes the operation of the relay RA (Fig. 4) by: wire *a* of the incoming junction (Fig. 2), contact *a* of the group of contacts CR.1, make contact *cx*.2, wire 1 (Figs. 2 and 4), break contact *ry*.5, make contact *re*.2, rectifier cell R*d*1, relay RA, ground.

(*b*) The application of an alternative voltage on the wire *a* of the incoming junction through the positive half waves causes the operation of relay RA in the same way as above described and by the negative half waves, the operation of relay RB through: wire *a* of the incoming junction, contact *a* of the group of contacts CR.1, make contact *cx*.2, wire 1 (Figs. 2 and 4), back contact *ry*.5, make contact *re*.2, make contact *ra*.1, rectifying cell R*d*2, relay RB, ground.

(*c*) The application of a positive voltage on wire *b* of the incoming junction causes the operation of relay RC through: wire *b* of the incoming junction, contact *b* of the group of contacts CR1, make contact *cx*.3, wire 2 (Figs. 2 and 4), back contact *ry*.6, make contact *re*.3, rectifying cell R*d*3, relay RC, ground.

(*d*) The application of a negative voltage on wire *b* of the incoming junction causes the operation of relay RD through: wire *b* of the incoming junction, contact *b* of the group of contacts CR.1, make contact *cx*.3, wire 2 (Figs. 2 and 4), back contact *rv*.6, make contact *re*.3, rectifying cell Rd4, relay RD, ground.

(*e*) The application of an alternating voltage on wire *b* causes the operation by is positive half-waves of relay RC, as it has been described above under (*c*) and by the negative half-waves the relay RD is operated as has been described above under (*d*).

The operation of relays RA, RB, RO, and RD gives eleven combinations which constitute the codes used. The receiver represented in Fig. 3 is provided for receiving two codes. The first code marked by the operation of a certain number of the relays RA, RB, RC, RD, is marked on the relays EAA, EAB, EAC, and EAD. Relay EAA is operated by means of the following circuit: ground, make contact *re*.5, back contact *rb*.1, make contact *ra*.2, back contact *rx*.2, relay EAA, battery. Relay EAB operates when relays RA and RB are actuated by means of the following circuit: ground, make contact *re*.5, make contact *rb*.1, back contact *rx*.3, relay EAB, battery. Relay EAC is controlled through relay RC by means of the following circuit: ground, make contacts *re*.5 and *rc*.1, back contact *rx*.4, relay EAC, battery. Relay EAD is controlled by the operation of relay RD through: ground, make contacts *re*.5 and *rd*.1, back contact *rx*.5, relay EAD, battery. Relays EAA, EAB, EAC and EAD give the first code marked on relays RA, RB, RC and RD. When relays RA, RB, RC, RD, fall back, relay RX operates through: ground, make contact *re*.5, right winding of RX, make contacts *eaa*.1, *eab*.1, *eac*.1, *ead*.1 of relays EAA, EAB, EAC and EAD which are actuated, the windings of relays EAA, EAC, EAD actuated, battery. Relay RX is held by means of the following circuit: ground, contact *re*.5, make contact *rx*.1, left winding of RX, battery. By its make contact *rx*.6, relay RX short-circuits its right winding in a way to apply an energizing direct ground to the receiving relay of the marker, as it will be explained later. The change over contacts *rx*.2, *rx*.3, *rx*.4, and *rx*.5 open the operating circuits of relays EAA, EAB, EAC and EAD and the operating circuits of relays EBA, EBB, EBC, EBD which will operate following the reception of the second code through relays RA, RB, RC, RD in the same way as for relays EAA, EAB, EAC, and EAD.

Following the falling back of relays RA, RB, RC, RD actuated after the reception of the second code, relay RY operates in the same way as RX and marks the end of the code reception. Relay RY is held by means of the following circuit: ground, make contact *re*.5, make contact *ry*.1, left winding of relay RY, battery and short-circuits its right winding through its make contact *ry*.4. Back contacts *ry*.5 and *ry*.6 open and separate relays RA, RB, RC, RD from the wires *a* and *b* of the incoming junction. This operation controls the stopping of the sending of codes to the register, by any means which will appear clearly to those skilled in the art. Then the receiver possesses all the indications required for the hunting for a free junction in a direction characterized by the two codes received and may seize a marker.

On the operation of relay RY, a battery is applied through make contact *ry*.2 to relay RM by means of a back contact *ro*.1. Relay RM finds an operating ground through wire 24 through back contacts such as *rm*/1 located, in the receivers set up the chain. As it has been stated above, the group selecting element considered has eight receiving circuits, two for each primary group. Contacts such as *rm*.1 in the receiver R1, are all connected in series, a ground being applied to one of the extremities of the chain. Under these conditions, when a relay RM has been operated only the relays the contacts of which are connected between the relay previously actuated and the ground, may operate. This chain of contacts *rm*. corresponds to a marking circuit. Each relay RM actuated locks through a contact *rm*.2 the operating circuit of connecting relay CP associated therewith and provided for connecting the corresponding receiving circuit, R1 in the case under consideration, to the marking circuit which corresponds to the chain of contacts *rm*/1. Contacts *rm*.2 are as contacts *rm*.1 connected in chain; the ground, however, is connected to the other extremity of the chain with regard to the chain of contacts *rm*.1 so that only the first relay CP, controlled through a contact *rm*.2 from the ground connected to the corresponding chain and associated with a relay RM actuated, may operate. In order to make clear the representation, the circuits corresponding to the other receiving circuits connected both at the right and left-hand of the receiving circuit RT, have been shown diagrammatically in CO.1 and CO.2. To facilitate the representation only the relays RM, RM′, RO, relating to receiver R1 and two markers M1 and M2 in the considered case, have been represented in Fig. 4. Fig. 11 shows in detail the connections between relays RM and RO in the case of three receivers schematically represented inside the frames in dot and dash lines R1, R2, R3 and two markers schematically represented inside the frames in dot and dash lines M1 and M2. Relays RO1, RO2, RO3, respectively in the receivers R1, R2, R3, show by their operation, the busying of the marker M1; relay RO′1, RO′2, RO′3, respectively in the receivers R1, R2, R3, show by their operation the busying of the marker M2. Each relay RM1, RM2, RM3 indicates, by its operation, that the marker M1 has been chosen by the receiver to which this relay is associated. Relays RM′1, RM′3 fulfill identical functions with respect to the marker M2. Each relay CP, CP21, for instance, connects, by its operation, a receiver to a marker, in the present instance receiver R2 to marker M1. In the markers M1 and M2, relays MZ1 and MZ2 respectively indicate by their operation, the busying of the corresponding marker. Each connecting relay and the associated contacts have been represented inside a dotted frame. It has been shown in CMZ1 a holding circuit of relay M1 comprising, as explained later, a contact of each of the relays of the marker M1. The circuit CMZ2 has an identical function with respect to relay MZ2 in the marker M2. At first, it will be assumed that the circuits R1, R2, R3, M1, and M2 are free and that the receiver R1 is brought into a calling condition, this being characterized by the closing of contacts *ry*1.2 and *ry*1.3 of relay RY1 (not shown) associated with receiver R1, the operation of which has been set forth in connection with Fig. 4. Then relay RM1, indicating that the marker M1 has been chosen, operates by means of the following circuit: battery, resistance Re11, make contact *ry*1.2, break contact *ro*1.1, winding of relay RM1, break contact *rm*1.1, ground. Through its make before break contact *rm*1.1, relay RM1 locks its holding circuit and break contact *rm*1.1 removes the operating ground of the relays located on the right hand in the chain, namely relays RM2 and RM3 of the receiving circuits R2 and R3, respectively. The connecting relay CP11 enabling the connection between the receiver R1 and the marker M1 now operates by means of the following circuit: battery, winding of connecting relay CP11, make contact *rm*1.2, break contact *rm*2.2, break contact *rm*3.2, ground. As the ground is connected in the left part of the chain of contacts *rm*1.1, *rm*2.1, *rm*3.1 and in the right part of the chain of contacts *rm*1.2, *rm*2.2, *rm*3.2, it will be understood that when two relays RM1 and RM3 of two receivers R1 and R2, for instance, operate simultaneously, only relay CP21, being the nearest of the ground which is connected to the chain of contacts *rm*1.2, *rm*2.2, *rm*3.2, may be operated and held, the operating ground of relay CP11 being removed from break contact *rm*2.2. Relay RM1 actuated will fall back soon after the operation of relay RO1, as it will be seen later. When relay CP11 operates, relay MZ1 indicating the busying of the marker M1, operates by the locking of contact *cp*11.1. Relay MZ1 closes through its contacts *mz*1.1, *mz*1.2, *mz*1.3 the operating circuits of the left windings of relays RO1, RO2, RO3 in series with resistances Re12, Re22, Re32, respectively in the receivers R1, R2, R3. Only relays RO2, RO3, operate, the left winding of relay RO1 being short-circuited by the ground of make contact *cp*11.9. The seizure of marker M1 by the receiver R1 is characterized by the operation of relays RO2 and RO3 in the two receivers R2 and R3, respectively.

Figure 6:
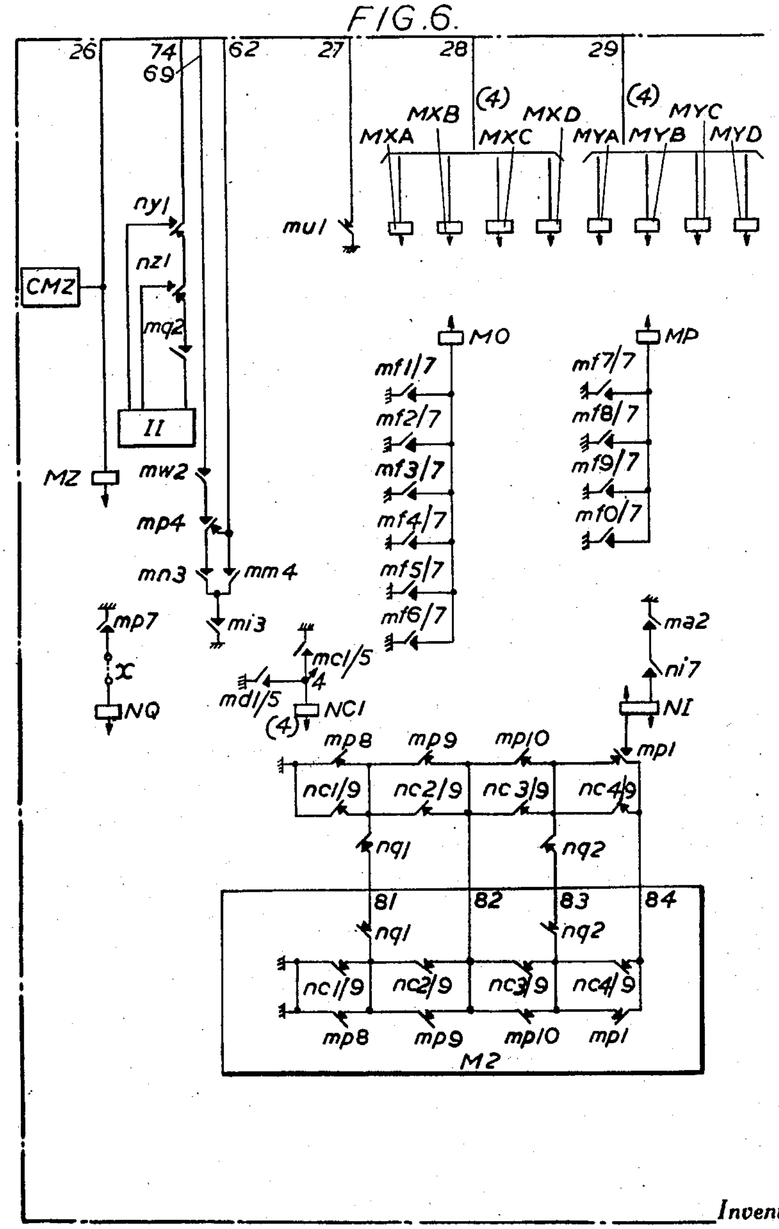
Figure 6A:
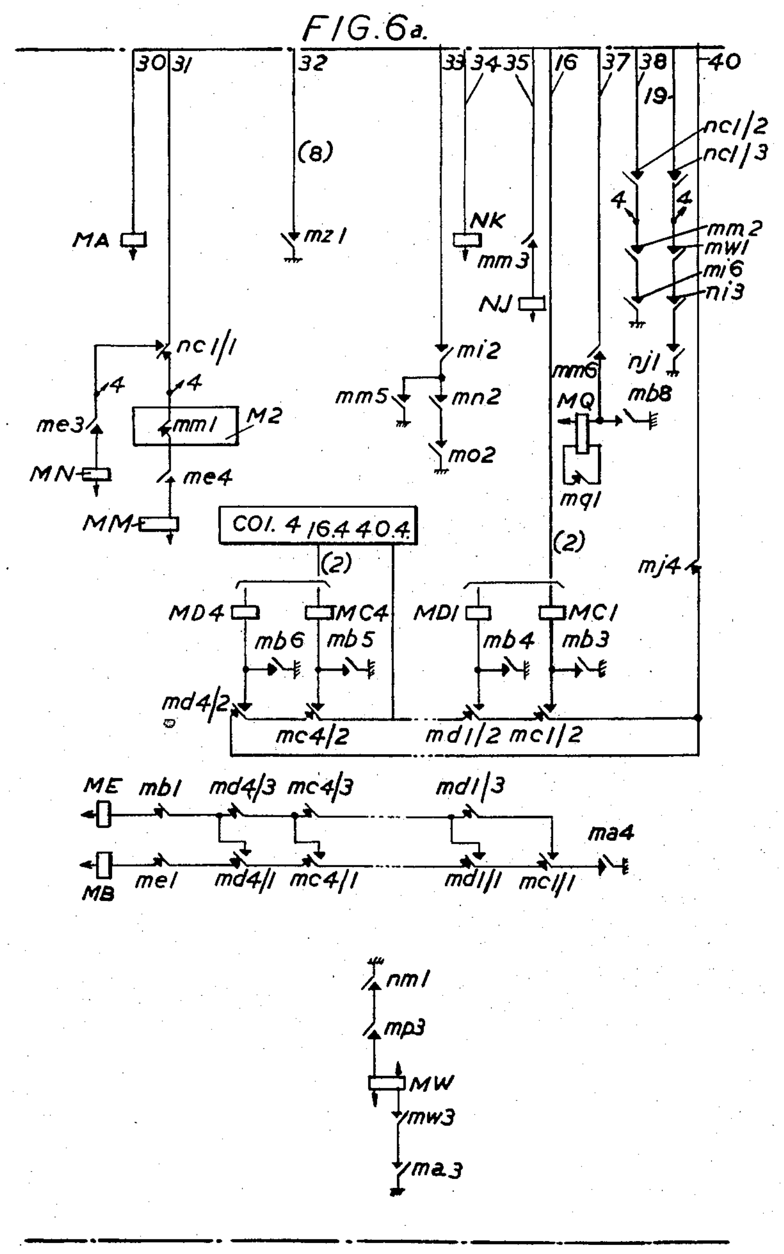

If the receiving circuit R2 is in a calling position, this being characterized as already indicated by the operation of a relay RY2 (not shown), relay RM′2, indicating that the marker M2, has been chosen, operates by means of the following circuit: battery, resistance Re21, make contact *ry*2.2, make contact *ro*2.1, break contact *ro*′2.1, relay RM′2, break contact *rm*′3.1, ground. Relay RM′2 locks by the make before break contact *rm*′2.1 and opens by the associated break contact, the operating circuit of relays RM′ located on the left hand of the chain, such as RM′1 in the present case. Through its contact *rm*′2.2, relay RM′2 closes the operating circuit of connecting relay CP22 provided for connecting the receiver R2 to the marker M2. Relay RO2 locks by means of the following circuit: ground, make contact *ry*2.3, break contact *ro*′2.2, make contact *ro*2.2, right winding of relay RO2, battery. The opening of the holding circuit through contact *ro*2.1, will thus be avoided in case the marker M1 is released. Through its contact *cp*22.1, relay CP22 causes the operation of relay MZ2 of the marker M2, the operation of which indicates the seizure of the marker M2 and which, as relay MZ1 of marker M1 has another operating circuit CMZ2 including a make contact for each of the relays of the marking circuit. Relay MZ2, through its contacts *mz*2.1, *mz*2.2, *mz*2.3, connects the operating ground to the left winding of each of the relays RO′1, RO′2, RO′3 in series with resistances Re13, Re23, Re33, respectively. Only relays RO′3 and RO′1 operate, the left winding of relay RO′2 being short-circuited by the ground connected to make contact *cp*22.9 of connecting relay CP22. It should be understood that the chains of contacts *rm*′1.2, *rm*′3.2 on the one hand and *rm*′1.1, *rm*′2.1, *rm*′3.1, on the other hand, have the same functions that the chains of contacts *rm*1.2, *rm*2.2, *rm*3.2 and *rm*1.1, *rm*2.1, *rm*3.1 and that consequently only one among relays CP12, CP22, CP32 may operate at the same time. Through its make contact *ro*′1.2, relay RO′1 closes the circuit of its right winding circuit in series with break contact *ro*1.2 and make contact *ry*1.3. In the receiver R3, the operating circuits of relays RM3 and RM′3 are open to make contact *ro*3.1 and *ro*′3.1, respectively, so that in case the receiver R3 is calling, which is characterized by the operation of relay RY3 (not shown) and the locking of make contacts *ry*3.2, *ry*3.3, relays RM3 and RM′3 cannot operate, the operating of these two relays being delayed until the falling back of one of the relays RO3 and RO′3, indicating the release of a marker. For instance, if marker M1 and receiver R1 are released, this being characterized by the falling back of relay RM1 and the opening of all the contacts of the circuit CMZ1, relay MZ1 falls back and opens its make contacts *mz*1.1, *mz*1.2, *mz*1.3, relays RO1 and RO3 fall back, relay RO2 being held, as explained above. At the falling back of relay RO3, the operating circuit of relay RM is closed by make contact *ro*3.1 and the connection of the receiver R3 to the marker M1 is made through connecting relay CP31, as it has been described above in case the connection of the receiver R1 to the marker M1 has taken place. In the considered case, it is assumed that relay RM represented in Fig. 4, operates and is held through the ground of make contact *rm*.1. Break contact *rm*.1 opens the chain of contacts *rm*/1 so as to avoid the operation of relays RM of the other receivers connected on the left of relay RM. Then the connecting relay CP operates through make contact *rm*.2, wire 25 and the chain of break contacts *rm*.2 in the receivers located in the left part of the chain and the ground. A connecting relay CP fulfills the function of connecting a receiver to a marker. All the contacts of the connecting relay CP are make contacts. Through its contact *cp*.1, relay CP causes the operation of busying relay MZ (Fig. 6) through wire 26 (Figs. 4 and 6). It is understood that the multipling arrow bearing the number 8 which appears on the wire 26 as well as on a number of wires at the output of the marking circuit indicates that the marking circuit is connected to the eight receiving circuits of the four primary groups. Through its contact *cp*.4, relay CP extends the ground of break contact *mu*.1 (Fig. 6) through wire 27 (Figs. 6 and 4), towards relay RJ (Fig. 4) of the receiver which operates through its right winding. Relay RJ, through contact *rj*.1 transmits the holding of the vertical electro-magnet CX (Fig. 2) from make contact *re*.5 of the receiver to break contact *mu*.1 of the marker. On the other hand, relay RJ closes, through its make contact *rj*.3 its holding circuit passing through its left winding: ground, make contact *cx*.1, wire 7 (Figs. 2 and 4), make contact *rj*.3, left winding of RJ, battery. Through contacts such as *cp*.5 and *cp*.6 and the corresponding wires such as 28 and 29, the inscribing relays of the marker MXA, MXB, MXC, MXD, and MYA, MYB, MYC, MYD, are connected in parallel with the registering relays EAA, EAB, EAC, EAD and EBA, EBB, EBC, EBD so that the codes recorded on these last relays are repeated on the corresponding relays of the marking circuit. Through its contact *cp*.7 and wire 30 (Figs. 4 and 6), the connecting relay CP causes the operation of relay MA which provides the main grounds in the marking circuit. Through its contact *cp*.9, relay CP short-circuits in the receiver, the left winding of the busying relay of the marker RO. Relay MZ, through its contacts such as *mz*.1, applies a ground to the left winding of busying relays RO of the marker in all the receivers. It is understood that there is only one contact *mz*.1 for each receiving circuit, each contact applying a ground to a wire such as 32 going to a receiver when the marking circuit is busy. In order to simplify the drawing, only one relay *mz*.1 has been represented and also a wire 32 with the number 8 between brackets. Relay RO corresponding to this marker operates in all the receivers, except in the calling receiver where it is short-circuited by contact *cp*.9, as explained above. If another receiver in which relay RO is actuated, is calling as soon as the relay RY of this receiver operates, the battery connected to make contact *ry*.2 is applied by the change-over contact *ro*.1 and make contact *ro*'1 to relay RM' corresponding to the second marker. This relay operates in the same manner as relay RM. Through make contact *ry*.3, relays RO of this receiver which was actuated holds by its right winding by means of the following circuit: ground, make contact *ry*.3, break contact *ro*'2, make contact *ro*.2, right winding of the relay RO, battery. Thus, during the seizure of the marker, that is to say during the time of operation of the relay RY, the busying relay RO remains operated even if the corresponding marker is released so as to maintain the battery of the make contact *ry*.2 on the relay RM'. If, at the time when the relay RY operates, the two markers are busy and if, consequently, the relays RO and RO' are operated, the holding circuit of these relays through the make contact *ry*.3 is cut off by the break contacts *ro*.2 and *ro*'2. Thus, as soon as one of the markers is released and the corresponding relay RO comes back to rest, the case previously described occurs again.

In the marker (Fig. 6), the operation of the recording relays MXA, MXB, MXC, MXD causes the operation of group relay MR among ten by means of the following circuit: ground, make contact *ma*.7 (Fig. 7), contact pyramid of relays MXA, MXB, MXC, MXD, relay MR, battery. It will be assumed that the outgoing junctions are divided into 100 directions, say 10 groups of 10 directions. Each of the relays MR characterizes a group of 10 directions. The contact pyramid of the relays MXA, MXB, MXC, MXD is provided in the conventional way so that a single operated relay MR corresponds to each combination of these relays. In order to simplify the drawing, only two chains of this pyramid have been represented, the first comprising the break contacts *mxa*.1, *mxb*.1, *mxc*.1 and the make contact *mxd*.1 and the second comprising the make contacts *mxa*.1, *mxb*.3, *mxc*.3 and *mxd*.3. It will be understood that the relays MYA, MYB, MYC and MYD control a similar contact pyramid, two chains of this pyramid having been represented, the first comprising the break contacts *mya*.1, *myb*.1, *myc*.1 and the make contact *myd*.1, and the second comprising the make contacts *mya*.1, *myb*.3, *myc*.3 and *myd*.3. A conductor such as 55 to which a ground is connected corresponds to each combination of those of the relays MYA, MYB, MYC and MYD operated. There are ten conductors such as 55 and each conductor is connected to a make contact such as *mr*.1 of each of the relays MR. So, 100 conductors, each of them characterizing a direction, are provided. The marking of one of these 100 conductors such as 54 corresponds to a particular combination of each of the relay groups MXA . . . MXD and MYA . . . MYD. As soon as the relay MA operates, the relay MB (Fig. 6) operates through the ground of the make contact *ma*.4 and the chain of the break contact *mc*1.1, *md*1.1 . . . *mc*4.1, *md*4.1, *me*1. The relay MG (Fig. 7) operates through the ground of the make contact *ma*.10 and the chain of the break contacts *mf*1.1, *mf*2.1 . . . *mf*9.1, *mf*0.1, *mh*.1 and *mj*.1. These two chains of contacts permit to check that the relays corresponding to the break contacts are at rest. As will be explained later on, these relays are used to hunt for the primary groups, the secondary groups and the internal junction which will be used for the establishment of the connection. In order to simplify the drawing, only the relays MC.1, MD.1 and MC.4, MD.4 corresponding respectively to the primary groups P1 and P4 have been represented on Fig. 6. Moreover, only the circuits controlled by the relays MC.1 and MD.1 associated to the primary group P1 have been shown. The circuits controlled by the relays MC.4 and MD.4, which are similar, are joined to the rectangle CO1.4 which represents the connecting circuit between the marker M1 and the two receivers R4 and R'4 of the primary group P4. Moreover, only the relays MF.1 and MF.2 and MF.9 and MG.0 (Fig. 7) corresponding to the secondary groups S1, S2 and S9, S0 have been represented, only the circuits associated to the relays MF1 and MF2 having been represented. The circuits associated to the relays MF.9 and MF.0 are represented as being joined to the frame carrying the two groups S9 and S0 which is schematically represented by the rectangle S9/0. Through the make contact *ma*.6 (Fig. 7), the auxiliary double test relay MS operates through its left winding. The relays MYA, MYB, MYC, MYD cause then through a wire 54 (Figs. 7, 5, 3) the operation of a marking relay SM (Fig. 3)

among 100. The relay SM, through its make contacts such as *sm*.1, extends the wires *m* of the outgoing junctions such as JS.1 belonging to the direction which it characterizes towards the relay or relays such as SA.1–8. In the present case, it has been assumed that there were ten secondary groups arranged on five frames of selectors. Each group comprises eight selectors whose outlets are multipled. Besides, each frame comprises 16 relays such as SA, namely: 8 per marker. The eight relays SA corresponding to a marker are defined in the following way: the relays SA.1, SA.2, SA.3; SA.4 corresponding to the junctions belonging to the first secondary group contained in the frame. The relays SA.5, SA.6, SA.7, SA.8 correspond to the second secondary group contained in the frame. The relays SA.1/2 and SA.5/6 correspond to the levels served by the splitting electro-magnet SSX, the relays such as SA.3/4 and SA.7/8 correspond to the levels served by the splitting electro-magnet SSY. The relays of odd row SA.1, SA.3, SA.5, SA.7 correspond to the levels served by the lower electromagnets of each selecting bar and the relays of even row such as SA.2, SA.4, SA.6, SA.8 correspond to the levels served by the upper electro-magnets of each selecting bar. The wire of each outgoing junction such as JS.1 is connected to a distributing frame RP1. At the outlet of this distributing frame, the wire *m* is connected to a second distributing frame RP2 through two make contacts *sm* and *sm'*. The contacts *sm*1 and *sm'*1 are controlled by the relays SM and SM' which characterize the direction to which the junction belongs and which are respectively controlled by the marking circuits M1 and M2 at the distributing frame outlet RP2, towards each secondary frame, two groups of 104 conductors corresponding to the 104 outgoing junctions of the two groups of 52 outgoing junctions constituting this frame are provided, the two groups of 104 conductors fulfilling respectively identical functions under the control of the two markers. The 104 conductors corresponding to a marking circuit are multiplied by 13 through decoupling resistances to control a relay SA. The thirteen multipled conductors correspond to junctions which can be chosen by controlling the operation of the same splitting electro-magnet and one of the 13 selecting electro-magnets of the same kind, i.e. controlling the rotation of the selecting bars in the same direction.

It will be understood that four relays SA per 52 levels of the same frame must be provided and as, in a secondary frame, the horizontal multipling of the vertical selectors are divided to provide two secondary groups, two groups of four relays SA are provided per secondary frame. To each relay SA, a relay SB corresponds and on Fig. 3 a group of four relays SB, namely; SB.1, SB.2, SB.3, SB.4 corresponding for instance to the relay SA of the secondary group S1, has been represented. It will be understood that a similar group of relays SB, which has been represented by the rectangle SBA, is associated in the same manner to the secondary group S2 carried by the same frame as the secondary group S1. The relays SA and SB (Fig. 3) fulfill functions identical to those of the relays PA and PB (Fig. 2). Like the four relays PB.1, PB.2, PB.3, PB.4 (Fig. 2), the relays SB.1, SB.2, SB.3, SB.4 are connected so that a single relay SB can operate at a time in such a way that if several relays SA are operated only one relay SB operates, thus effecting a choice among the junctions corresponding to the relays SA operated, as has been disclosed in the case of the relays PA and PB (Fig. 2). Each of the 104 conductors at the outlet of the distributing frame RP2 leads also to a contact *sb* of the relay SB associated to the relay SA controlled by this conductor. The four conductors of the outlet of RP2, controlled by contacts *sb* of relays SB associated to relays SA corresponding in the two groups S1 and S2 to the four junctions chosen by controlling the same selecting bar in one of its positions, i.e. by operating the same selecting electro-magnet, are multipled, after the contacts *sb*, so as to control this electro-magnet, for instance SSS (Fig. 3). Each of the 26 selecting electro-magnets such as SSS controls through a make contact such as SSS.2 the application of a ground on a conductor connected to eight make contacts of each of the relays SB. These contacts such as *sb*1/5 are multipled by 4 to control respectively the two splitting electro-magnets SSX and SSY. As has been disclosed in the case of a relay PB (Fig. 2), the relays SB.1 and SB.3 correspond to a junction chosen for the same make position of the splitting bar, the relays SB.2 and SB.4 corresponding to the other position.

Only the circuits associated to a marker, M1 for instance have been considered. Similar circuits are provided for the other marker M2. It is necessary to provide eight relays SA' which are controlled by the 104 outgoing conductors of the distributing frame RP2, controlled by contacts *sm'*1. Two groups of four relays similar to SB.1, SB.2, SB.3, SB.4 are associated to the eight relays SA' and they have been schematically represented by the rectangle SBA'. In the same way, the selecting and splitting electro-magnets are controlled in parallel by circuits associated to the marker M2, identical to those described with reference to the marker M1 and which have only been indicated by multipling arrows, the differentiation of the control circuits used being effected from marking circuits, as will be explained later on.

Figure 7:
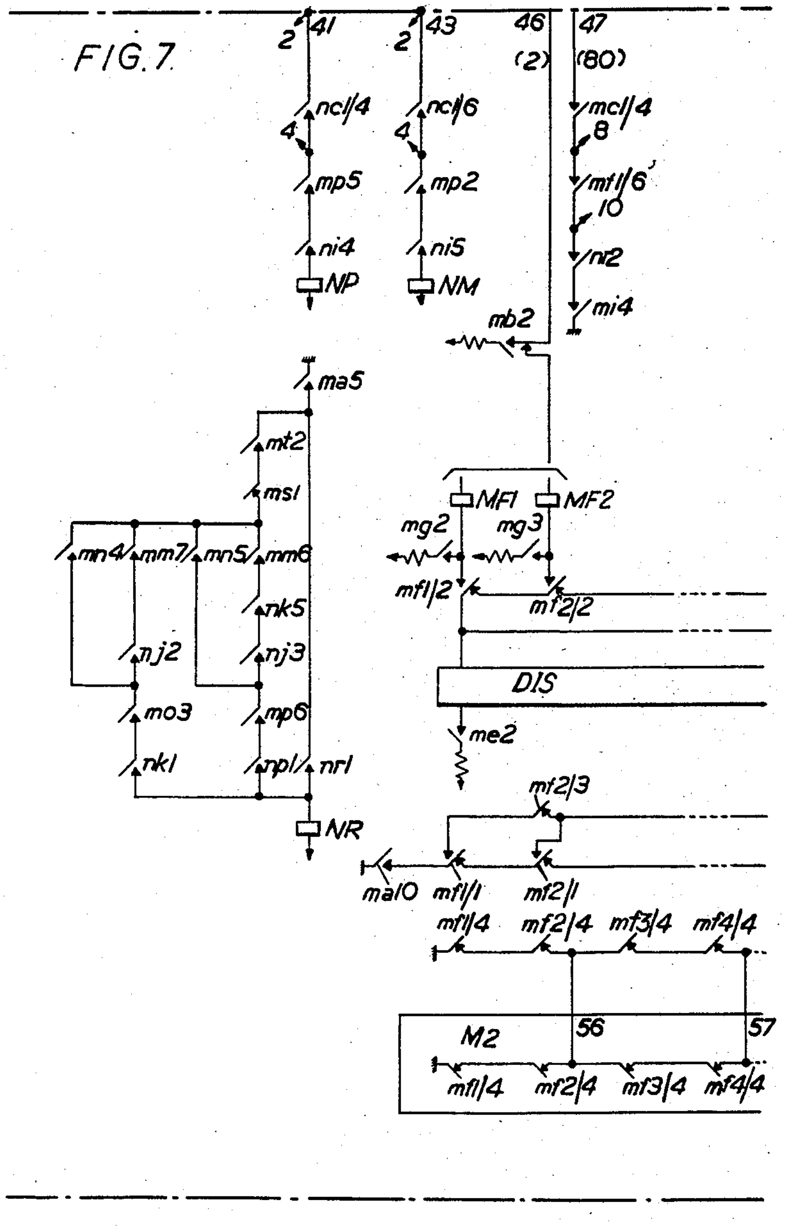
Figure 7A:
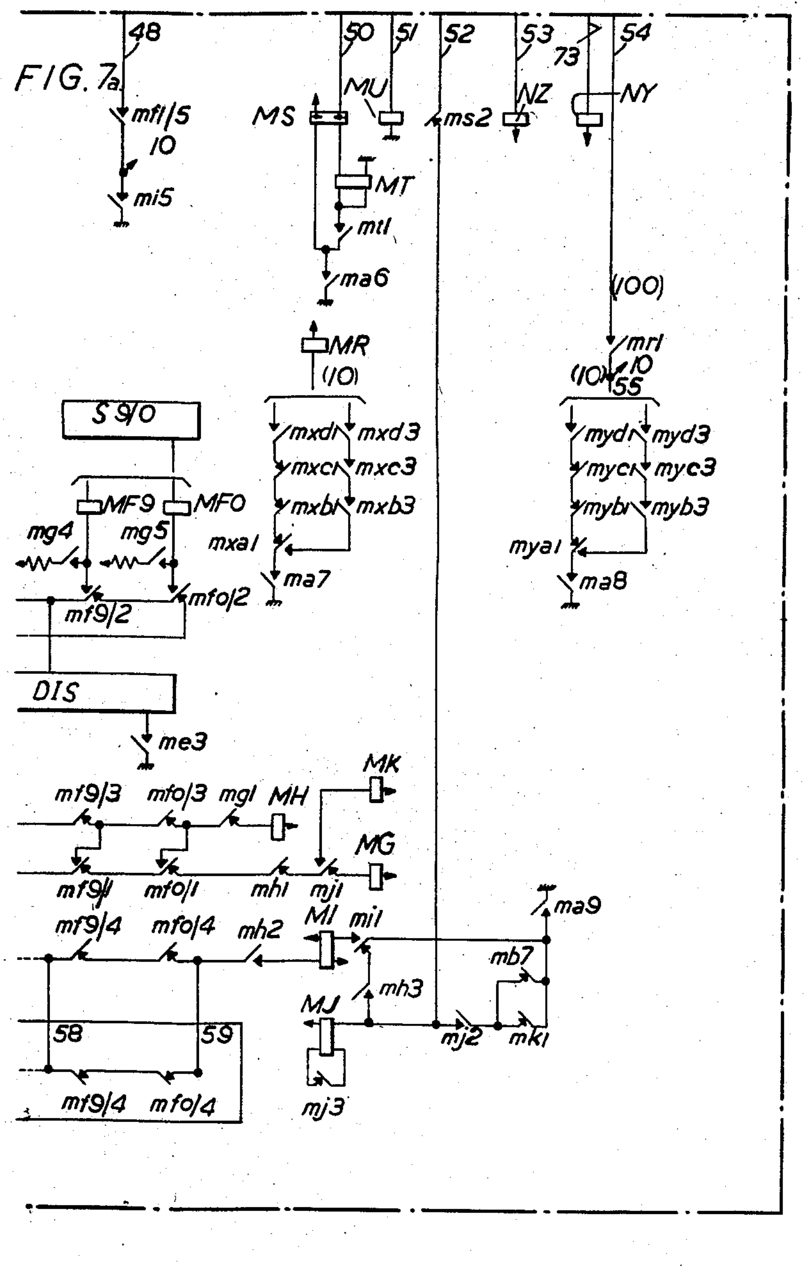

The junctions of the direction determined by the operated relay SM can be distributed in all the secondary groups and relays such as SA can operate in all the frames of the secondary groups. All the junctions leading to the group where free outgoing junctions in the requested direction are represented are marked by means of the following circuit: battery, make before break contact *mb*.2 (Fig. 7), wire 46 (Figs. 7, 5 and 3), contact such as *sa*.3 of one of the four relays SA associated to the considered group in the frame under consideration, rectifier cell R*d*5, break contact *sv*.6, wire *a* of the internal junction, wire *a* (Figs. 3 and 2), break contact *pv*.6, wire 16 (Figs. 2, 4 and 6), relay such as MC.1 or MD.1, make contact *mb*.3, earth. As it has been explained, a battery is applied on the conductor 46 (Figs. 7, 5 and 3) by the marking circuit. There is a conductor 46 per secondary group. The conductor 46 is controlled by four contacts such as *sa*.3 connected in parallel and corresponding to the relay SA associated to this group. Then, this battery is applied to the wire *a* of each of the eight internal junctions corresponding to the eight vertical selectors of the group and this, through a rectifier such as R*d*5 and of a break contact *sv*.6 of the associated vertical selector. It results that a battery is applied to the wire *a* of all the free internal junctions connected to this secondary group, if there is among the outgoing junctions connected to this secondary group at least one free outgoing junction in the requested direction, which is indicated by the operation of a relay SA. Moreover, the wires *a* of the twenty internal junctions connected to a primary group are divided into two groups of ten, each of them comprising an internal junction towards each of the secondary group. The ten wires *a* of the internal junction of the same group are connected in parallel through the break contacts *pv*.6 of the associated vertical selectors. So, there are provided per primary group, after the multipling of two conductors such as 16, each of them having access to ten internal junctions, one towards each secondary group, say eight conductors for the four groups. Each of these conductors 16 (Figs. 2, 4, 6) leads to a relay such as MC.1. There are two relays per primary group for instance MC.1, MD.1 for the group P1 and MC.4, for the group P4, as the relays corresponding to the group P2 and P3 have not been represented, and the two conductors 16.4, 40.4 fulfill functions identical to those of the conductors 16 and 40 with respect to the group P4. The second marking circuit uses a similar but separate testing circuit, as it has been explained in connection with the junction diagram (Fig. 1). It is possible to follow this circuit which starts from the marker M2 schematically represented on Fig. 5, the wire 46' (Figs. 5 and 3), four contacts in parallel such as *sa'*3, the rectifier R*d*6, the break contact *sv*.7, the wire *b* of the internal junction (Figs. 3 and 2), the contact *pv*.7, eight conductors such as 16' (Figs. 2, 4 and 5), (two per primary group), to the marker M2 (Fig. 5) in which there is a circuit identical to the one described in connection with the marker M1 (Figs. 6–7). The marker M2 which is identical to the marker M1 has been represented by rectangles bearing the reference M2 on Figs. 5, 6 and 7 so as to make the drawing easier. The relays such as MC.1 and MD.1 of each primary group having free internal junctions leading to secondary group where at least one free outgoing junction in operation in the requested direction is represented. The chain of break contacts such as *mc*.1/1, *md*.1/1 opens and the relay MB is de-energized. The contacts *mb*.3, *mb*.4, *mb*.5, *mb*.6 open and only one of the relays MC.1, MD.1 . . . MC.4, MD.4 remains operated, owing to the arrangement of the contacts *mc*.1/2, *md*.1/2 . . . *mc*.4/2, *md*.4/2 which constitute an arrangement known under the name of preferential chain. The preferential ground is applied to the conductors such as 40 and 40.4 so that the preference is given to the operated relays MC, MD whose contacts in the chain are the first on the left of the connecting point of the conductor such as 40 marked by means of a ground. The ground is applied on the conductor such as 40 corresponding to the calling primary group through the contact *cp*.14 (Fig. 4) of the two connecting relays such as CP which is associated to the receiver R1, R'1 of the calling primary group which has been used to serve the call, which may be understood by the multipling arrow 2'.

As soon as the relay MC.1 operates, the relay NC.1 corresponding to the calling primary group, say P1, operates by make contact *mc*.1/5. There are four relays NC.1, NC.2, NC.3, NC.4, one per primary group. If the primary group determined by the operated relay NC.1 corresponds to the calling primary group determined by the operated connecting relay CP, the relay MN (Fig. 6) operates by means of the following circuit: ground, make contact *cp*.8, wire 31 (Figs. 4 and 6), make contacts *nc*.1/1 and *me*.3, relay MN, battery. The operation of the relay MN indicates that the connection will be established by using an internal junction between the calling primary group and a secondary group having at least one free outgoing junction in the requested direction. In the opposite case, the relay MM operates by means of the following circuit: ground, make contact *cp*.8, wire 31 (Figs. 4 and 6), break contact *nc*.1/1, break contact *mm*.1/1 of the relay MM of the other marker (indicated by the rectangle M2), make contact *me*.4, relay MM, battery. The operation of the relay MM indicates, as will be explained in detail later on, that the connection will be established by using a mutually assisting junction. As soon as one relay such as MC.1 and one only is operated, the relay ME operates by means of the following circuit: ground, make contact *ma*.4, make contact *mc*.1/1, chain of the break contacts such as *md*.1/3, *mc*.4/3, *md*.4/3, break contact *mb*.1, relay ME, battery. Through the contact *cp*.14, the wide 40 (Figs. 4 and 6) and the break contact *mj*.4, the preference is given to the relays MC.1 and MD.1 which correspond to the calling primary group P1, so as to take in preference direct internal junctions between the calling primary group and a secondary group to which at least one free outgoing junction in the requested direction is connected. First of all it will be assumed that one of relays MC.1, MD.1, MC.1 for instance, has operated. The relay MB, as it is de-energized modifies, via its contact *mb*.2, the holding circuit of the operated relay MC.1 in the following way: ground, make contact *cp*.14, wire 40 (Figs. 4 and 6), break contact *mj*.4, make contact *mc*.1/2, relay MC.1, wire 16 (Figs. 6, 4 and 2), break contact *pv*.6, wire *a* of the internal junction (Figs. 2 and 3), break contact *sv*.6, rectifier cell R*d*5, contact *sa*.3, wire 46 (Figs. 3, 5 and 7), break contact *mb*.2, relay MF.1 for instance, make contact such as *mg*.2, resistance, battery.

Each relay MF.1 . . . MF.0 corresponds to a secondary group. The relays MF corresponding to the secondary group having free outgoing junctions in the requested direction and whose free internal junction corresponds to the operated relay MC.1 operate. Through the opening of break contacts such as *mf*.1/1, the relay MG is de-energized and suppresses through its contacts such as *mg*.2 the battery circuits of the different relays MF.1 . . . MF.0. The contacts *mf*.1/2 . . . *mf*.0/2 constitute a preferential chain operating in the same way as the chain *mc*.1/2, *md*.1/2 . . . *mc*.4/2, *md*.4/2 (Fig. 6). The result is that only one of the relays MF.1 . . . MF.0 is held by the battery of the make contact *me*.2 provided on this chain by the distributing frame DIS by means of conductors provided for this purpose. As soon as one of the relays such as MF.1 and only one is operated, whenever the relay ME operates, it applies via its make contact *me*.3 a ground to the distributing frame so as to cause it to take a step forward and to modify the preference between the relays MF.1 . . . MF.0; the relay MH operates by means of the following circuit: ground make contact *ma*.10, make contact *mf*.1/1, chain of break contacts such as *mf*.2/3 . . . *mf*.9/3, *mf*.0/3, *mg*.1, relay MH, battery. The calling primary group, the secondary group which is going to be seized and the internal junction which connects the calling primary group to the secondary group by the combination of the relay MC.1 and of the relay MF.1 in the case under consideration are then known.

Before proceeding with the establishment of the connection, it is necessary to make sure that the second marker does not want to effect a connection in the same secondary frame, which is checked by the chain of break contacts such as *mf*.1/4, *mf*.2/4, *mf*.3/4, *mf*.4/4 and *mf*.9/4, the wires 56, 57, 58 and 59 and by a similar chain of contacts in the marker M2. As soon as the relay M*f*.1 operates, if, in the second marker; the relays MF.1 and MF.2 corresponding to the two groups S1 and S2 located in the same frame are at rest, the relay M1 operates by means of the following circuit: ground, break contacts *mf*.1/4 and *mf*.2/4 in the marker M2, wire 56, and in the marker under consideration, chain of break contacts such as *mf*.3/4, *mf*.4/4 . . . *mf*.9/4, *mf*.0/4, make contact *mh*.2, lower winding of the relay M1, battery.

It has been explained that the internal junction was determined by the combination of the relay MC.1 (Fig. 6) and of the relay MF.1 (Fig. 7). In this case, if, in a primary group, the selectors corresponding to the internal junctions are arranged in the same order as the respective secondary groups it is then possible to determine if the chosen internal junction leads to the main frame or to the auxiliary frame of the chosen primary group. If the selector under consideration belongs to the main frame, the relay MO operates through its contact *mf*.1/7. The relay MO can also be operated by the contacts *mf*.2/7 . . . *mf*.6/7 corresponding to internal junctions connected to the main frame and the relay RH operates by means of the following circuit: ground, make contact *mo*.2, *mn*.2, *mi*.2, wire 33 (Figs. 6 and 4), contacts *cp*.10 of the connecting relay, break contact *rh'*1 of the second receiver R'1, winding of the relay RH, battery. The relays RH of the two receivers of the same primary group mutually open their operating circuit through the break contact *rh'*1 so that only one relay RH per primary circuit interruption can operate. Through the break contact *rh*.2, each relay RH of each of the two receivers R1, R'1 of the primary group under consideration suppresses from the wire 12 (Figs. 4 and 2) the operating ground of the relays PB in the primary group P1 under consideration. Through the make contact *rh*.4 of either receiver, a ground is applied on the wire 13 and the relay PD (Fig. 2) operates if the selecting electromagnets PSS and PSE are at rest and if the chain of break contacts such as *pss*.1 and *pse*.1 closes the battery circuit. The relay PD operates and through its make contact *pd*.2 causes the operation of the relay PE which, through its contacts such as *pe*.2 and *pe*.3 close the battery circuits of the selecting electro-magnets PSS and PSE. In the receiver R1 the relay R1 operates as soon as PD is operated, by means of the following circuit: ground, make contact *pd*.1, chain of break contacts such as *pb*.1/4 . . . *pb*.4/4, wire 11 (Figs. 2 and 4), make contact *rh*.3 of the relay RH of the receiver R1, left winding of the relay R1, battery. This relay is held by its right winding and its make contact *ri*.6 on the ground of the make contact *rh*.5. The operating circuit of the selecting electro-magnet corresponding to the incoming junction JE having seized the receiver R1 closes in the following way: ground, make contacts *mi*.3 and *mm*.3 (Fig. 6), break contact *mp*.4, wire 62 (Figs. 6 and 4), contact *cp*.3 of the connecting relay, make contact *ri*.2, wire 4 (Figs. 4 and 2), make contact *cx*.5, bank *c'* and contact *c'*1 of the contact group CR1, selecting electro-magnet PSS, make contact *pe*.2, chain of break contacts such as *pss*.1, resistance, battery. The operating circuit of the splitting electro-magnet for instance PSX, corresponding to the incoming junction JE having called the receiver R1, is identical up to the bank *c'* of the contact group CR1, and from there, through the contact *c'*2, the wire 5 (Figs. 2 and 4), the make contact *ri*.4 for instance the wire 10 (Figs. 4 and 2), the splitting electro-magnet PSX and the battery. As soon as the selecting electro-magnet PSS operates, through the opening of the chain of the break contacts such as *pss*.1, the relay PD is de-energized and de-energizes the relay PE. When a selecting electro-magnet and a splitting electro-magnet are operated, the following control circuit is closed: ground, break contacts *pd*.1, and *pe*.1 make contacts *psx*.2 and *pss*.2, wire 14 (Figs. 2 and 4), make contact *ri*.1 and *rj*.2, contact *cp*.11 of the connecting relay, wire 34 (Figs. 4 and 6), relay NK of the marker, battery. As soon as the relay M1 operates, the selection for a free outgoing junction in the requested direction connected to the chosen secondary group is effected in the following manner: the relays SB.1, SB.2, SB.3, SB.4 (Fig. 3) of the chosen secondary group corresponding to operated relays SA are supplied by means of the following circuit: ground, make contact *mi*.5, make contact *mf*.1/5, wire 48 (Figs. 7, 5 and 3), make contacts such as *sa*.1/2 of the operated relays SA of the chosen secondary group and the circuits associated to the relays SB.1, SB.2, SB.3, SB.4 up to the battery. Owing to circuits associated to these relays, only one of them can be maintained operated and it determines a group of 13 outgoing junctions in the chosen secondary group among which there is at least one free outgoing junction in the requested direction. Through contacts such as *sb*.4 of the operated relay SB, the availability ground connected to the wire *m* of the free outgoing junctions in the requested direction is applied to the corresponding selecting electro-magnets SSS. As soon as one of the relays SA operates, the relay SD operates if all the splitting and selecting electro-magnets SSS, SSX and SSY are at rest, and this by means of the following circuit: ground, make contact such as *sa*.1/1, contacts such as *sa*.1/1 of the eight relays SA and of the eight relays SA' being connected in parallel, relays SD, break contacts *ssy*.1, *ssx*.1 and chain of break contacts such as *sss*.1, battery. Through its make contact *sd*.2, the relay SD operates the relay SE. The relay SE through its contacts such as *se*.2 closes the operating circuits of the selecting electro-magnets SSS, So, after the operation of relay SB, SB.1 in the case under consideration, the electro-magnets SSS corresponding to the free junctions in the requested direction and belonging to the group of 13 junctions determined by SB.1 operate. The relay SD battery circuit of which is opened through the break contacts such as SSS.1 is de-energized and de-energizes the relay SE which opens the operating circuit of the selecting electro-magnets SSS. Through the chain of the reverse contacts such as *sss*.1, only the operated selecting electro-magnet, the corresponding make-before break contact *sss*.1 of which is the nearest to the battery, can be held and the others are deenergized. The splitting electro-magnet corresponding to the relay SB.1 operates in the following manner: ground, make contacts *sss*.2, make contact *sb*.1/5, splitting electro-magnet SSX, battery. At this moment, the electro-magnet Y of the vertical selector used for the double test operates by means of the following circuit: ground, make contacts *sss*.2 and *ssx*.2, break contacts *sd*.1 and *se*.1, break contact *y*.2, lower winding of the electro-magnet Y, battery. The electro-magnet Y operates and is held through its make contact *y*.1 and its two windings in series. It effects the connection of the wire *a* and *t* of the chosen outgoing junction JS.1 respectively to the wires 63 and 64 if this junction belongs to the secondary group determined by MF.1 and to the wires 65 and 66 if this junction belongs to the secondary group S2 determnied by MF.2. The following double testing circuit is closed: battery, test resistance RT in the outgoing junction JS.1 circuit, wire *t*, bank *t*.1 of the vertical selector Y, wire 64, make contact *y*4, make contact *sb*.1/6 of the operated relay SB.1, wire 50 (Figs. 3, 5 and 7), right winding of the relay MS (Fig. 7) and the two windings in series of the relay MT, ground. It will be understood that eight contacts such as *sb*.1/6, belonging to four relays SB corresponding to the first marker and to four relays SB' (not represented in detail) corresponding to the second marker, these two groups of four rleays being associated to the same group, S1 in the case under consideration, are connected in common to the contact *y*4 on the one hand, and on the other, by groups of four corresponding to the two markers to two conductors such as 50 going respectively towards the two markers (the wire 50' being represented in Fig. 5 as connected to the marker M2). It will also be understood that the contacts *sb*.5/6 are grouped in the same manner; in addition, the two conductors such as 50 respectively going towards the two markers are common to the two groups of contacts *sb*.1/6 and *sb*.5/6. The two groups of contacts *sb*.1/7 and *sb*.5/7 are arranged in the same manner and lead to two wires such as 51 respectively leading to the two markers. The contact *y*3 leads to the 16 contacts *sb*.1/8 corresponding to the four groups of four relays SB which are respectively associated to the two groups of the frame and to the two markers. The eight conductors of the contact outlets such as *sb*.1/8 corresponding to the same marker are multipled and the two conductors such as 52 lead respectively to the two markers. If the junction is free, the relay MT (Fig. 7) operates and through its make contact *mt*.1 and the ground of the make contact *ma*.6, it short-circuits its high resistance right winding. If the two markers do not effect simultaneously the same operation, the flux originated by the differential right winding of MS de-energizes it. At this moment, the selecting bars corresponding to the incoming junction in the primary group and to the outgoing junction in the secondary group are set into position and the connection can be effected. The relay NR operates by means of the following circuit: ground, make contact *ma*.5, make contact *mt*.2, break contact *ms*.1, make contacts *mn*.4, *mo*.3 and *nk*.1, NR, battery. The relay NR is held through its make contact *nr*.1 on the ground of the make contact *ma*.5. By means of the following circuit: ground, make contact *mi*.4 and make contacts *nr*.2, *mf*.1/6 and *mc*.1/4, wire 47 (Figs. 7, 5 and 3), a ground is applied on the wire *t* of the internal junction. It will be understood that the multipling arrows bearing the indexes 8 and 10 on this circuit indicate that 80 conductors are thus controlled by the contact pyramid, these conductors corresponding to the 80 vertical selectors of the secondary groups. The vertical electro-magnets SV and PV operate in the same manner by means of the following circuit; ground, of wire *t*, beak contact *sv*.2, lower winding of the electro-magnet SV, battery and, when operated, are held through their make contacts such as *sv*.1 and their two windings in series. It will be understood that the electro-magnet PV operates in a similar way. The connection of the incoming junction to the outgoing junction is effected in the primary group by the contacts *a, b, c, t* of the vertical selector controlled by the electro-magnet PV and the contacts *pv*.3, *pv*.4, *pv*.5, *pv*.2 (Fig. 2), the wires *a, b, c, t* of the internal junction and, in the secondary group, by the make contacts *sv*.3, *sv*.4, *sv*.5, *sv*.2 and the contacts *a, b, c, t* of the vertical selector controlled by the electro-magnet SV. The register circuit, which is not represented in detail, is provided so as to apply a battery on the wire *a* as soon as the codes are sent on, which has been represented by the contact F in the rectangle JE (Fig. 2). When the connection is effected, this battery is extended to the relay MU of the marker by means of the following circuit: battery, contact F of the junction JE (Fig. 2), wire *a* of the junction JE, contact *a* of the vertical selector PV, make contact *pv*.3, wire *a* of the internal junction (Figs. 2 and 3), make contact *sv*.3, contact *a* of the vertical selector SV, contact *a*.1 of the double testing selector Y, wire 63, make contact *y*.5, make contact *sb*.1/7, wire 51 (Figs. 3, 5, 7), relay MU of the marking circuit (Fig. 7), ground. This relay indicates the establishment of the connection and through its break contact *mu*.1 (Fig. 6), it opens the holding circuit of the electro-magnet CX of the vertical selector of the receiver R1 (Fig. 4). The connection of the calling junction to the receiver is opened so that the selecting and splitting electro-magnets PSS and PSX are respectively de-energized by the opening of the contact *cx*.5. In the receiver R1 (Fig. 4), the relays RE and RF are de-energized by the opening of the make contact *cx*.6 (Fig. 2) and, by the opening of its contact *re*.5 (Fig. 4), the relay RE de-energizes the registering relays EAA, EAB, EAC, EAD, and EBA, EBB, EBC, EBD and the relays RX and RY. RY as it is de-energized, causes the release of the relay RM and opens the holding circuit of the relays such as RO which were operated when RY was operated. The relays RM de-energizes by the opening of the make contact *rm*.2, the connecting relay CP which, by opening its contact *cp*.7, de-energizes the relay MA (Fig. 6). The electro-magnet SV of the operated vertical selector (Fig. 3) opens through its contact *sv*.6 the operating circuit of the relay MF.1 which is de-energized and causes through its contact *mf*.1/1 the release of the relay MH. The relay MH opens through its contact *mh*.2 the operating circuit of the relay M1. Moreover, the holding circuit of the relay M1 is opened by the contact *ma*.9. The relay M1 is de-energized and through its make contact *mi*.4, suppresses the ground applied to the wire *t* of the internal junction through the medium of the wire 47 (Figs. 7, 5 and 3). Moreover, the relay M1, through its make contact *mi*.3, suppresses the operating ground of the one of the relays SB which is operated. SB.1 in the case under consideration. Through the opening of the contact *ma*.8, the relay MA suppresses the ground applied to the relay SM by the conductor 54 (Figs. 7, 5, 3). Owing to the de-energization of the relay SM, the relays SA and the selecting electro-magnet SSS which were operated are de-energized. Through the opening of the make contact *sss*.2, the splitting selectro-magnet SSX and the electro-magnet Y are de-energized. All the common devices of the secondary frame S1/2 and the relays corresponding to the marker used are then at rest. The relay MA suppresses the operating grounds of the different circuits and the relays of the marking circuit are brought to rest again. When all the relays are at rest, the relay MZ, which is held operated by a circuit represented diagrammatically in CMZ and which comprises in parallel a contact of each of the relays of the marking circuit, can be de-energized and, by opening its make contacts such as *mz*.1, it opens the operating circuit of the busying relays RO of this marker in all the receivers. The marker is then free and can serve a new call. In the receiver (Fig. 4), the relay RK is held by its make contact *rk*.2 and its lower winding in series with a circuit CRK comprising in parallel a make contact of each of the relays of the receiver except the relays such as RO, as long as these relays are not all at rest. The relay RK is then the last to be de-energized and, by closing its break contact *rk*.1, it permits again the operation of the relay RG. The relay RH is de-energized when the marker is released and the break contact of the relays of the two receivers of the primary group under consideration, through the closure of break contacts such as *rh*.2, applies a ground on the wire 12 which is going to allow the operation of the relays PB when there is a call by an incoming junction.

The connection established between the calling junction and the outgoing junction in the requested direction is held by the holding general ground which is applied on the wire *t* in the incoming junction JE owing to means well-known in the art and which have been represented diagrammatically by the contact G. The ground connected to the wire *t* through the contact G of the incoming junction JE holds the relay T through the make contact *t*.1 and it is extended to the wire *t* of the outgoing junction which is thus busy. Means which have not been represented cause then in the circuit of the outgoing junction JS.1 the opening of the contact M, which suppresses the ground of the wire *m* of the junction JS.1 which cannot be seized any more. The multipling arrows connected to the wires *a, b, c, t, m,* of the outgoing junction S.1 indicate that this junction can be multipled on other elements of group selection of the same type or of a different type.

If, when a secondary group has been chosen by a relay such as MF.1 and the second marker is effecting a connection in the frame containing the chosen secondary group, the relay MH operates and the relay M1 cannot operate because the control ground is cut off by the break *mf*.1/4 in the first marker and in the second marker at the break contact *mf*.1/4 or *mf*.2/4 (Fig. 7). In this case, the slow-acting relay MJ (Fig. 7) operates by means of the following circuit: ground, make contact *ma*.9, break contact *mi*.1, make contact *mh*.3, upper winding of the relay MJ and battery. The relay MJ is held by means of the following circuit: ground, make contact *ma*.9, break contact *mk*.1, make contact *mj*.2, upper winding of MJ, battery. Through its break contact *mj*.3, it opens the short-circuit of its lower winding so as to be de-energized without delay. Through its break contacts such as *mj*.4, it suppresses the holding ground of test relays such as MC.1 and MF.1. These relays are de-energized and when all the relays such as MF.1 are at rest, the relay MK operates by means of the following circuit: ground, make contact *ma*.10, chain of break contacts such as *mf*.1/1, *mf*.2/1 . . . *mf*.9/1, *mf*.0/1, break contact *mh*.1, make contact *mj*.1, relay MK, battery. When all the relays such as MC.1 and MD.1 are at rest, the relay MB (Fig. 6) operates by means of the following circuit: ground, make contact *ma*.4, chain of break contacts such as *mc*.1/1, *md*.1/1, *mc*.4/1, *md*.4/1, break contact *me*.1, relay MB, battery. The relay ME, as it is de-energized, opens its make contacts *me*.2 and *me*.3 and causes the distributor D.1S to move a step forward, as has been explained above. The relays MB and MK being operated, the holding circuit (Fig. 7) of the relay MJ is opened by break contacts *mb*.7 and *mk*.1. The relay MJ is de-energized and through its make-before-break contact *mj*.1, causes again the operation of the relay MG. The break contact *mj*.4 closes again and a new test can take place, but the choice priority of the secondary groups has been modified. If other free junctions in the requested group are in different secondary groups, a secondary group will be chosen. The priority is distributed on the chain of reverse contacts such as *mf*.1/2, *mf*.2/2 so that the progress of one step in the priority causes the choice priority in a different frame. The connection is thus effected as has been described above.

When the secondary group has been chosen, if the internal junction connecting the calling primary group to this secondary group is in the auxiliary frame C1.2 of the primary group, the relay MP operates for instance through the make contacts *mf*.7/7, *mf*.8/7, *mf*.9/7, *mf*.0/7. In this case, before effecting the connection, it is necessary to make sure that the selecting electro-magnets of this auxiliary frame are at rest and the second marker does not want to effect a connection in this auxiliary frame. If it is assumed that the relays MC.1 and consequently NC.1 are excited in the second marker, the relay NI operates by means of the following circuit: ground, break contact *nc*.1/9, break contact *nq*.1, wire 81 between the second and the first marker (Fig. 6), chain of break contacts such as *nc*.2/9, *nc*.3/9, *nc*.4/9, make contact mp.1, left winding of the relay NI, battery. The relay NI is held on the round of the make contact *ma*.2 by its make contact *ni*.7 and its right winding. The control of the stopping of the selecting electro-magnets in the auxiliary frame is effected by means of the following circuit: ground, break contacts *asx*.1, *asy*.1 (Fig. 3), break contacts *ass*.1/1 . . . *ass*.20/1 and six break contacts *ase*1/1 . . . *ase*6/1, wire 43 (Figs. 3, 5, 7), make contacts *nc*.1/6, *mp*.2, *ni*.5, relay NM, battery. The relay NM operates and causes the operation of the control relay MW (Fig. 6) by means of the following circuit: ground, make contacts *nm*.1 and *mp*.3, left winding of MF, battery. The relay MW is held by its right winding, the ground of the make contact *ma*.3 and its make contact *mw*.3. The operation of the selecting electro-magnets such as ASS of the auxiliary frame is made through the following circuit: ground, make contacts *mi*.3, (Fig. 6), *mn*.3, *mp*.4 and *mw*.2, wire 69 (Figs. 6 and 4), contact *cp*.2 of the connecting relay, wire 3 (Figs. 4 and 2), make contact *cx*.4 and contact *c*.1 of the group of contacts CR1, wire 22 (Figs. 2 and 3) in the auxiliary frame of the electro-magnet ASS, battery. The splitting electro-magnet, ASX for instance, operates in the same manner until the bank *c* of the group of contacts CR1 is reached through: contact *c*2 of this same group CR1, wire 21 (Figs. 2 and 3), electro-magnet ASX, battery.

When a splitting electro-magnet and a selecting electro-magnet of the auxiliary frame are operated, the control relay NP in the marker operates by means of the following circuit:ground, make contacts *asx*.2 and *ass*.1/2 (Fig. 3), wire 41 (Figs. 3, 5 and 7), make contacts 4 *nc*.1/4, *mp*.5, *ni*4, relay NP, battery. The relay NM having its operating circuit opened in the auxiliary frame is de-energized but the relay MW (Fig. 6) remains operated. Meanwhile, the circuit of the secondary group effects the hunting for a free outgoing junction in the requested direction in the aforesaid manner and when the splitting and selecting bars are set into position in this group, the double test connecting device Y operates and the double test is effected as previously by the relay MS which is de-energized and the relay MT which operates. The connection can take place and the control relay NR operates by means of the following circuit:ground, make contact *ma*.5, make contact *mt*.2, break contact *ms*.1, make contacts *mn*.5, *mp*.6 and *np*.1, relay NR, battery. As it has been described above, the relay NR, through its make contact *nr*.2, applies a ground on the wire *t* of the chosen internal junction, which brings about the operation of the vertical electro-magnets PV and SV which establish the connection between the incoming junction and the outgoing junction. The battery applied on the wire *a* of the incoming junction is again extended to the relay MU which operates and, by opening its break contact *mu*.1 (Fig. 6) de-energizes the connecting electro-magnet CX of the incoming junction to the receiver. The release of the receiver and of the marker is effected as previously and the splitting and selecting electro-magnets of the auxiliary frame are deenergized when the make contact *cx*.4 opens.

If the auxiliary frame is divided into two primary groups, it is necessary, before effecting a connection in this frame, to be sure that the second marker does not also require to effect a connection in this frame. To this purpose, the connection *x* is effected between the relay NQ and the make contact *mp*.7 (Fig. 6). Thus, when the relay MP operates, the relay NQ also operates. The relay NQ opens through its contacts *nq*.1 and *nq*.2 the wires 81 and 83 (Fig. 6) between the marker 1 and the marker 2. The relay MP operates as above and the relay N1 can only operate if, in the second marker, the relay MP is at rest or, when energized, if the relays NC.1 and NC.2 are at rest, i.e. if the second marker does not require to work in the auxiliary frame in either primary group having access to this frame, the discrimination being effected by means of a contact arrangement clearly understood by those skilled in the art. The proceeding of the connection is effected in the previously described manner.

In the course of the hunting for an internal junction between the primary groups and the secondary groups having free junctions in the requested direction, it may happen that no direct junction between the calling primary group and any of the secondary groups having free junctions in the requested direction is to be found. The relays such as MC.1 and MD.1 corresponding to the first primary group which has been assumed calling remain at rest and a relay, MC.4 for instance, corresponding to another primary group operates. The primary group P4 has been represented on Fig. 8 in a simplified way, only the elements necessary to the mutual assistance having been represented. The choice of a secondary group is then made from this relay MC.4 in the same manner as previously. A relay such as MF.1 operates, is held and controls the operation of the relay MH. If the second marker does not require to effect a connection in the same secondary frame, the relay MI operates through the closure of the make contact *mh*.2 (Fig. 7). The operation of the relay MC.4 causes through the closure of the make contact *mc*.4/5, similar to *mc*.1/5, the operation of the relay NC.4, similar to NC.1. As soon as the relay ME operates, the relay MM characterizing a connection by mutual assistance operates by means of the following circuit: ground, contact *cp*.8 (Fig. 4) of the connecting relay, wire 31 (Figs. 4 and 6), break contact *nc*.1/1, break contact *mm*.1 in the second marker, make contact *me*.4, winding of MM and battery. The relays MM of each marker mutually cut off their operating circuits so that only one of these relays can operate.

First of all, it will be assumed that the chosen secondary group corresponds to an internal junction located in the main frame of the primary group effecting the mutual assistance. In this case, the relay MO operates through a make contact such as *mf*.1/7. In the primary group effecting the mutual assistance, a relay PF′ characteristic of the calling primary group operates by means of the following circuit:ground, make contact *mi*.6 (Fig. 6), make contact *mm*.2, make contact *nc*.4/2, similar to *nc*.1/2, wire 38 (Figs. 6 and 4), contact *cp*.13, wire 18′ (Figs. 4, 5, 3, 8), relay PF′, battery. There are three relays PF per primary group and in order to explain their function and operation, Fig. 9 must be referred to.

The primary groups P1, P2, P3, P4, each of them comprising three relays PF corresponding to the other three groups have been represented within frames in dot and dash lines. Thus, the relay PF.12 of the primary group P1 corresponds to the primary group P2. It will be understood that the operation of a relay, PF.24 for instance, indicates that the calling group is the group P4 and that the connection will be established through the group P2. In the marker M1, the closure of the contact *mm*.2 indicates that the connection is effected by mutual assistance and the one of the contacts *nc*.1/2, *nc*.2/2, *nc*.3/2, *nc*.4/2 which is closed indicates the primary group chosen to effect the mutual assistance. The calling primary group is indicated by the operation of one of the four associated connecting relays (one per marker and per receiver), three contacts of a single connecting relay having been represented per primary group, *cp*.1/13, *cp*.2/13, *cp*.3/13, *cp*.4/13. On Fig. 4, only one contact *cp*.13 for the receiver R1 of the group P1 and only one relay PF' (Fig. 8) have been represented. The relay PF represented on Fig. 2 is not used in the particular example of connection described and in order to simplify the drawing, its control circuit has been represented diagrammatically by the rectangle ACP. The operation of a relay PF of a primary group is then clearly shown and the meaning of the multipling arrow 6 of the wire 38 to the connection of Figs. 6 and 4 is then easily understood. The free mutually assisting selectors in the calling primary group have a ground applied on their wire *m* by the break contact *ev*.7. This ground causes the operation of the relay PA' in the group effecting the mutual assistance (Fig. 8) by means of the following circuit: ground, break contact *ev*.7 (Fig. 2), wire *m* of the mutually assisting junction (Figs. 2, 3, 8), make contact *pf'*1, decoupling resistance, relay PA', battery. A mutually assisting junction selection in the primary group P4 effecting the mutual assistance (Fig. 8) is made by the selecting electro-magnets PSE' in the same manner as the hunting for a calling incoming junction by the electro-magnets PSS' (Fig. 2). An electro-magnet PSE' and a splitting electro-magnet such as PSX' having operated, the control of this operation is sent on to the marker via the following circuit: ground, break contacts *pd'*1 and *pe'*1, make contact *pse'*.2, one of the six contacts such as *pse'*2, in parallel corresponding to the twelve levels used for the mutual assistance, wire 15' (Figs. 8, 3, 5, 4), wire 35 (Figs. 4 and 6), make contact *mm*.3, relay NJ, battery. The relay NJ operates. In the calling primary group (Fig. 2), the operation of the selecting electro-magnet PSS and of the splitting electro-magnet PSX or PSY corresponding to the level of the incoming junction and which are located in the main frame, as is shown on Fig. 1, is effected as follows: first of all, the relay RH of the receiver operates by means of the following circuit: ground, make contacts *mm*.5 and *mi*.2, wire 33 (Figs. 6 and 4), contact *cp*.10, break contact *rh'*1 of the relay RH' of the second receiver R'1 of the group, winding of the relay RH, battery. The operation of the relay RH causes as previously the operation of the relay RI which, through its make contact *ri*.2, closes the following circuits: ground, make contacts *mi*.3, and *mm*.4, wire 62 (Figs. 6 and 4), contact *cp*.3 of the connecting relay, make contact *ri*.2, wire 4 (Figs. 4 and 2), make contact *cx*.5, bank *c'* and contact *c'*1 of the group of contacts CR1, electro-magnet PSS, make contact *pe*.2, chain of break contacts such as *pss*.1 on the one hand and on the other, ground on the bank *c'* of the group of contacts CR1, wire 5 (Figs. 2 and 4), make contact *ri*.4 or *ri*.5 in the receiver R1, wire 10 (Figs. 4 and 2), splitting electro-magnet PSX or PSY, battery. As above, the control of the operations is sent on to the marker by means of the following circuit: ground, break contacts *pd*.1 and *pe*.1, make contacts *psx*.2 and *pss*.2, wire 14, make contacts *ri*.1, *rj*.2, contact *cp*.11 of the connecting relay, wire 34 (Figs. 4 and 6), relay NK, battery. Meanwhile, the hunting for an outgoing junction has been effected in the chosen group, the double test has taken place through the operation of MT and the de-energization of MS (Fig. 7). The connection can then take place and the relay NR operates by means of the following circuit: ground, make contact *ma*.5, make contact *mt*.2, break contact *ms*.1, make contact *mm*.7, make contacts *nj*.2, *mo*.3, relay NR, battery.

As previously, a ground is applied on the wire *t* of the chosen internal junction by means of the following circuit: ground, make contacts *mi*.4, *nr*.2, *mf*.1/6 and *mc*.4/4 such as *mc*.1/4 and through the wire 47 (Figs. 7, 5 and 3). The vertical electro-magnets SV in the secondary group and PV' (Fig. 8) in the primary group operate in a previously described manner. The electro-magnet SV connects the internal junction to the outgoing junction and the electro-magnet PV' connects the internal junction to the mutually assisting junction. Meanwhile, it extends the ground of its wire *t* to the wire *t* of the mutually assisting junction and to the vertical electro-magnet EV (Fig. 2) which operates by means of the following circuit: ground of the wire *t* of the internal junction, wire 75 (Fig. 8), make contact *pv'*2, wire *t* (Figs. 8, 3 and 2), break contact *ev*.2, lower winding of EV, battery. It is held by the ground of the wire *t*, its make contact *ev*.1 and its two windings in series. The vertical selector EV (Fig. 2) connects the mutually assisting junction to the incoming junction. The connection is then established and the battery, applied on the wire *a* of the incoming junction, is extended by means of the following circuit: battery, wire *a* of the incoming junction, bank *a* of the mutually assisting selector EV (Fig. 2), make contact *ev*.3, wire *a* of the mutually assisting junction (Figs. 2, 3, 8), bank *a* of the vertical selector PV' (Fig. 8) in the primary group, make contact *pv'*3, wire *a* of the internal junction (Figs. 8 and 3), make contact *sv*.3 of the selector SV in the secondary group, bank *a* of the selector SV, contacts of the bank *a*.1 of the double test connecting device in the secondary group, wire 63, make contacts *y*5 and *sb*.1/7, wire 51 (Figs. 3, 5, 7), relay MU of the marker, ground. As in the previous case, the relay MU de-energizes the vertical connecting electro-magnet CX of the incoming junction to the receiver and releases the marking circuit as already described. In case there would be no direct internal junction between the calling primary group and a secondary group having free junctions in the requested direction and the chosen internal junction would lead to the auxiliary frame of the primary group chosen to effect the mutual assistance, the relay MP operates instead of the relay MO when a choosing relay of a secondary group, for instance the relay MF.7, is excited through the make contact *mf*.7/7 (Fig. 6). In this case, the choice of a mutually assisting selector and of the corresponding junction is made in the same manner as previously but since the vertical electro-magnet PV' is in an auxiliary frame, it is necessary to operate in this frame the splitting and selecting electro-magnets such as ASE' and ASX' (Fig. 8), determining a level corresponding to the chosen mutually assisting junction. The relays NC.4, MP and NI having operated as in the case of the mutually assisting connection in the main frame, the circuit controlling the stopping of the electro-magnets controlling the horizontal bars in the auxiliary frame is closed by means of the following circuit: ground, chain of the break contacts *asx'*1 . . . *ase'*6/1, wire 43' (Figs. 8 and 3), wire 43 (Figs. 3, 5 and 7), make contacts *nc*.4/6 similar to *nc*.1/6, *mp*.2 and *ni*.5, relay NM, battery. This relay causes the operation of the relay MW (Fig. 6) by means of the following circuit: ground, make contact *nm*/1, make contact *mp*.3, left winding of MW, battery. When the selection for a level corresponding to the chosen mutually assisting junction is completed, it has been seen that the relay NJ was then operating. The operating circuit of the control electro-magnets of the horizontal bars of the auxiliary frame is closed:

ground, make contacts *nj*.1, *ni*.3, *nw*.1, *nc*.4/3 similar to *nc*.1/3, wire 19 (Figs. 7 and 4), wire 19′ (Figs. 4, 5, 3 and 8), make contact *pse*′2, electro-magnet ASE′, battery for the selecting electro-magnet and: ground on the wire 19′, as above, make contact *psx*′2, electro-magnet ASX′, battery, for the splitting electro-magnet. The control of this operation is sent on to the marker by: ground, make contact *asx*′.2, make contact such as *ase*′.1/2, wire 41′ (Figs. 8 and 3), wire 41 (Figs. 3, 5, 7), make contact *nc*.4/4 similar to *nc*.1/4, *mp*.5, *ni*.4 relay NP, battery. As soon as the relay NI operates, when the secondary group has been chosen, the splitting and selecting electro-magnets PSS and PSX determining the level corresponding to the calling incoming junction operate as already described and the control of this operation is given in the marker by the excitation of the relay NK.

Meanwhile, as soon as the relay MI has operated, the choice of a level corresponding to a free outgoing junction in the requested direction is effected as already described and the control of this operation is provided by the de-energization of the relay MS and the operation of the double test relay MT, as it has been described above. The connection can take place and the relay NR operates by means of the following circuit: ground, make contacts *ma*.5 and *mt*.2 (Fig. 7), break contact *ms*.1, make contacts *mm*.6, *mk*.5, *nj*.3, *mp*.6, *np*.1, relay NR, battery. The relay NR operates in the aforesaid manner and applies a ground on the wire *t* of the internal junction. As in the previous case, this ground causes the operation of the vertical electro-magnets SV and PV′ of the internal junction and the operation of PV′ causes the operation of the electro-magnet EV of the mutually assisting selector. The connection is established and in the same way as previously, the battery of the wire *a* of the incoming junction is extended to the relay MU of the marker which causes as above described the de-energization of the electro-magnet *ex* connecting the incoming junction to the receiver and thus releases the circuits of the marker. In case an auxiliary frame is common to two primary groups, it is necessary to make sure before effecting a connection in this frame that the other marker does not want to effect a connection in this same frame, as it has already been described.

As it has been explained, after the choice of a free outgoing junction in the requested direction, the test of this junction is effected so as to check that it is not seized at the same time by another element for group selection. This test is effected by means of the relays MS and MT (Fig. 7) and if the junction is free, MS is de-energized and MT operates. In the opposite case, i.e. if this junction is seized at the same time by another group selector, the relay MS cannot be de-energized and thus causes the operation of the slow-acting relay MJ by means of the following circuit: ground, contact *y*.3 (Fig. 3), make contact *sb*.1/8, wire 52 (Figs. 3, 5, 7), break contact *ms*.2, upper winding of MJ, battery. The relay MJ is held by its contact *mj*.2 and by the opening of its break contact *mj*.4, it causes a new test of an internal junction, this test being effected after the distributor DIS (Fig. 7) has stepped so as to modify the test priority of the secondary group, as it has already been described. If all the internal junctions liable to be used to serve the call are busy, the relay MQ operates. As soon as the marker is seized by the connecting device CP, the relay MA operates and closes the operating circuit of the relay MB which closes the operating circuit of the relay MQ through its contact *mb*.8. The relay MQ the lower winding of which is short-circuited by its contact *mq*.1 does not operate at once. If all the outgoing junctions in the requested direction are busy, the relay SA does not operate so that the relays such as MC.1 and MD.1 . . . MC.4 and MD.4 cannot operate. The relay MB then remains operated so that the relay MQ operates after a certain delay characterizing the impossibility of routing the call. If the free outgoing junctions in the requested direction are connected to secondary groups all the internal junctions of which are busy, the corresponding relays SA operate but cannot close the circuits of relays such as MC.1, MD.1, MC.4, MD.4 which are opened at the break contacts such as *sv*.6, *pv*.6 of the electro-magnets of the vertical selectors such as SV, PV.

The condition previously described for the operation of the relay MQ appears again.

If the internal junctions leading to the secondary groups liable to serve the call are connected to primary groups other than the calling primary group and if all the mutually assisting selectors liable to be used are busy, the relay MQ operates by means of the following circuit: ground, chain of make contacts such as *ev*. 6, (Fig. 2) of all the mutually assisting selectors of the calling primary group, wire 17 (Figs. 2 and 4), make contact *cp*. 12 of the connecting device, wire 37 (Figs. 4, 6), make contact *mm*. 6, upper winding of the relay MQ, battery. On the other hand means are provided in common for the outgoing junctions of the same direction to indicate the busying of all junctions of this direction and these means have been represented diagrammatically by the contact GJS1. The multipling indicates that the wire *d* is multipled on all the elements for group selection in the same manner as the junctions JSE. When all the junctions of the requested group are busy and the requested direction has no overflow routing the relay NZ of the marker (Fig. 7) operates by means of the following circuit: ground, contact GJS1 (Fig. 3), jumping junction *j*1 of the distributing frame RP1, contact *sm*. 2, wire 53 (Figs. 3, 5 and 7), relay NZ, battery. If the requested direction has an overflow routing, the jumping junction *j*2 is connected instead of the jumping junction *j*1 and the relay NY operates instead of the relay NZ by means of the following circuit: ground, contact GJS1 (Fig. 3), jumping junction *j*2, make contact *sm*. 3, wire 73 (Figs. 3, 5 and 7), relay NY, battery. If the relay NY is operated, the overflow routing indication is sent on to the calling junction, from the circuit II, make contact *ny*. 1, wire 74 (Figs. 6 and 4), make contacts *cp*. 15 and *ry*. 6, wire 2 (Figs. 4 and 2), make contacts *cx*. 3, bank *b* of the group of contacts CR1, wire *b* of the incoming junction. In case all the junctions in the requested direction are busy and this direction has no overflow routing, the relay NZ operates and through its contact *nz*. 1, it applies to the wire *b* of the incoming junction a suitable signal provided by the generator II. It is the same thing in the case of the operation of the relay MQ indicating the internal blocking if the relays NZ and NY remain at rest, in which case a suitable signal is transmitted from the circuit II.

While the principles of the invention have been described above in connection with specific embodiments and particular modifications thereof, it is to be clearly understood that this description is made only by way of example and not as a limitation on the scope of the invention.

What is claimed is:

1. In or for an automatic telephone system a group selection arrangement comprising primary switches, secondary switches, links connecting said primary and secondary switches, means for providing access over said links for any inlet of said primary switches to any outlet of said secondary switches, a plurality of markers, means for providing individual access for said markers to inlets of said primary switches, to outlets of said secondary switches, and to said links, and means in said markers first to test for a possible path through the group selection arrangement and second to control the establishment of said path, means being provided for supervising the operation of said markers in order to defer the operation of one or more markers when two or more markers are about to use the same switch or switches for the establishment of the respective paths.

2. In a group selection arrangement, according to claim 1, mutual assistance links providing access between respective pairs of primary switches, and testing means in each of said markers adapted to test, in response to the fact that the links having access to a first primary switch to which the calling incoming trunk is connected are not available, for a free link connected to a second primary switch and for a free mutual assistance link between said second primary switch and said first primary switch, said marker being adapted to control the establishment of the connecting path through said first primary switch, said mutual assistance link, said second primary switch, said link, and a secondary switch.

3. In a group selection arrangement, in combination, an incoming trunk, a plurality of outgoing trunks, a stage of primary selection including a plurality of selectors grouped in primary groups, a stage of secondary selection including a plurality of selectors grouped in secondary groups, the levels of the selectors of the same group being multipled and the incoming trunk being connected to levels of the primary groups, the outgoing trunks being connected to levels of the secondary groups, a plurality of internal links for connecting each primary group to each of the secondary groups, a plurality of mutual assistance links for connecting each primary group to the other primary groups, two common control circuits connected to the incoming trunks, each common control circuit comprising means for receiving from the incoming calling trunk information about the outgoing required trunk, a pair of markers, means accessible to said markers for causing the marking of the free internal link leading to secondary groups to which at least a free outgoing trunk in the required direction is connected, means for testing all of the internal links simultaneously for each primary group so as to determine the primary group through which the call will be served by choosing preferably the group to which the calling incoming trunk is connected, means accessible to said markers for thereafter marking among the internal links thus determined an internal link between the primary group thus determined and each of the secondary groups so as to choose a secondary group through which the call will be served, and means for thereafter choosing a free mutual assistance link between the chosen primary group and the primary group to which the calling incoming trunk is connected and for controlling the establishment of the connection, the two said marking means of the internal link to which the two markers have access being independent from each other, and means in each marker for checking before the establishment of the connection to determine whether the other marker is not controlling or is not ready to control a connection in the same group or groups of selectors having common means of control.

4. In a group selection arrangement, the combination, according to claim 3, in which each internal link comprises several conductors, different conductors being used for the two common control circuits to which the two markers have respectively access.

5. In a group selection arrangement, the combination, according to claim 3, further comprising a plurality of internal links between each primary group and each secondary group, and testing means adapted to test inside each primary group simultaneously for a group of internal links comprising an internal link towards each of the secondary groups so as to effect simultaneously the choice of a primary group and of a single internal link towards each of the secondary groups to which at least one free outgoing trunk in the required direction is connected.

6. In a group selection arrangement, the combination, according to claim 3, further comprising marking circuits for mutual assistance links common to the two markers, and means in each marker for checking whether the other marker is not testing the said mutual assistance links, said means being adapted to cause the test of the said mutual assistance links immediately if the marking circuits are free, or to delay this test if the marking circuits are busy.

7. In a group selection arrangement, the combination, according to claim 3 further comprising a plurality of receiving circuits adapted to cooperate with each of the primary groups, each receiving circuit being adapted to be connected to an incoming trunk connected to this group via a selector associated with it, means in each receiver adapted to cause the connection of said receiver to a calling incoming trunk via the associated selector; means to receive and register the information transmitted by the calling incoming trunk about the required outgoing direction, and means to cause the connection of said receiving circuit to a free marker and to transmit to it the information on the required outgoing direction.

8. In a group selection arrangement, the combination, according to claim 3, further comprising means in each marker adapted for testing the free or busy condition of said mutual assistance links, and separate means for testing the free or busy condition of secondary groups, the two said means operating independently from each other and simultaneously when marking circuits of said mutual assistance links are not engaged by the other marker.

References Cited in the file of this patent

UNITED STATES PATENTS

| | | |
|---|---|---|
| 2,583,848 | Johnson | Jan. 29, 1952 |
| 2,587,103 | Boyer | Feb. 26, 1952 |
| 2,598,412 | Moder | May 27, 1952 |
| 2,679,552 | Jacobaeus | May 25, 1954 |
| 2,711,444 | Oberman | June 21, 1955 |
| 2,735,893 | Le Gourrierec | Feb. 21, 1956 |